(12) United States Patent
Gagliardi et al.

(10) Patent No.: US 8,812,434 B2
(45) Date of Patent: Aug. 19, 2014

(54) DATA STRUCTURE FOR EFFICIENTLY IDENTIFYING TRANSACTIONS

(71) Applicant: CA, Inc., Islandia, NY (US)

(72) Inventors: Marco Gagliardi, Brisbane, CA (US); Martin Tali, Foster City, CA (US); Ramesh Mani, Fremont, CA (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 13/651,160

(22) Filed: Oct. 12, 2012

(65) Prior Publication Data

US 2014/0108463 A1    Apr. 17, 2014

(51) Int. Cl.
*G06F 17/00* (2006.01)

(52) U.S. Cl.
USPC .............................. 707/602; 707/603; 707/797

(58) Field of Classification Search
CPC .................... G06F 17/30861; G06F 17/30011; G06F 17/3002; G06F 17/30873; G06F 17/30356; G06F 17/30; G06F 17/30286; G06F 17/30864; G06F 17/30867; G06F 17/30991; G06F 17/30315; G06F 17/30327; G06F 17/30345; G06F 17/10; G06F 17/17
USPC .......................................... 707/797, 602, 603
See application file for complete search history.

(56) References Cited

U.S. PATENT DOCUMENTS

| | | | |
|---|---|---|---|
| 5,481,699 A * | 1/1996 | Saether | 714/15 |
| 6,813,587 B2 * | 11/2004 | McIntyre et al. | 702/183 |
| 6,823,355 B1 | 11/2004 | Novaes et al. | |
| 7,003,781 B1 | 2/2006 | Blackwell et al. | |
| 7,246,144 B2 | 7/2007 | Walsh et al. | |
| 7,313,114 B2 * | 12/2007 | Karjalainen | 370/335 |
| 7,818,418 B2 | 10/2010 | Bansal et al. | |
| 7,870,431 B2 | 1/2011 | Cirne et al. | |
| 2003/0174165 A1 | 9/2003 | Barney | |
| 2004/0078691 A1 * | 4/2004 | Cirne et al. | 714/38 |
| 2004/0111488 A1 | 6/2004 | Allan | |
| 2005/0222689 A1 | 10/2005 | Smith et al. | |
| 2007/0143323 A1 | 6/2007 | Vanrenen et al. | |
| 2007/0143743 A1 | 6/2007 | Cobb et al. | |
| 2007/0169052 A1 | 7/2007 | Vanrenen et al. | |

(Continued)

OTHER PUBLICATIONS

Paul, "Metrics based classification trees for software test monitoring and management", Sixth International Conference on Tools with Artificial Intelligence, pp. 534-540, IEEE 1994, 7 pages.

(Continued)

*Primary Examiner* — Pierre Vital
*Assistant Examiner* — Andalib Lodhi
(74) *Attorney, Agent, or Firm* — Vierra Magen Marcus LLP

(57) ABSTRACT

A technique for monitoring software which efficiently communicates transaction trace data, including static and dynamic data, from an agent to a manager is disclosed. A tree data structure describes transactions as a sequence of transaction elements. Each branch may correspond to one type of transaction. The nodes along a branch may be associated with components of monitored software that are invoked to perform the transaction. A provisional branch may be constructed when an agent is unable to initially identify the transaction. Transaction data may be stored in association with the nodes in the provisional branch during the monitoring. After information needed to identify the transaction becomes available to the agent, the provisional branch is updated. The transaction data is reported in response to determining the branch in the tree data structure that matches the provisional branch.

23 Claims, 26 Drawing Sheets

(56) References Cited

U.S. PATENT DOCUMENTS

| | | | |
|---|---|---|---|
| 2007/0263541 A1 | 11/2007 | Cobb et al. | |
| 2007/0266045 A1* | 11/2007 | Bansal et al. | 707/104.1 |
| 2009/0112667 A1 | 4/2009 | Blackwell et al. | |
| 2010/0281488 A1 | 11/2010 | Krishnamurthy et al. | |
| 2012/0275682 A1* | 11/2012 | Ihara | 382/134 |

OTHER PUBLICATIONS

Office Action dated Jun. 10, 2013, U.S. Appl. No. 13/211,163, filed Aug. 16, 2011, 37 pages.

U.S. Appl. No. 13/211,163, filed Aug. 16, 2011.

Preliminary Amendment dated Feb. 7, 2012, U.S. Appl. No. 13/211,163, filed Aug. 16, 2011, 12 pages.

Response to Office Action dated Sep. 10, 2013, U.S. Appl. No. 13/211,163, filed Aug. 16, 2011, 16 pages.

Response to Office Action dated Feb. 5, 2014, U.S. Appl. No. 13/211,163, 17 pages.

Final Office Action dated Nov. 5, 2013, U.S. Appl. No. 13/211,163, filed Aug. 16, 2011, 29 pages.

* cited by examiner

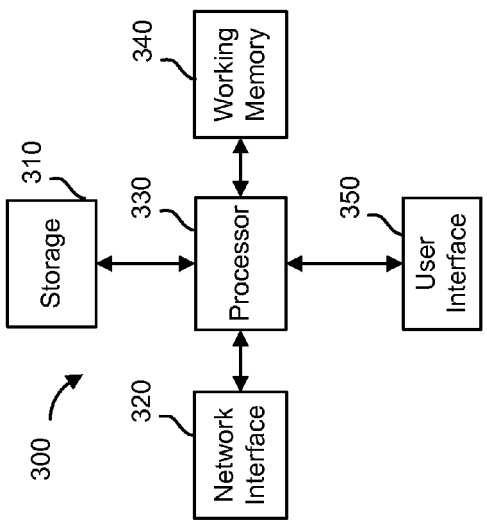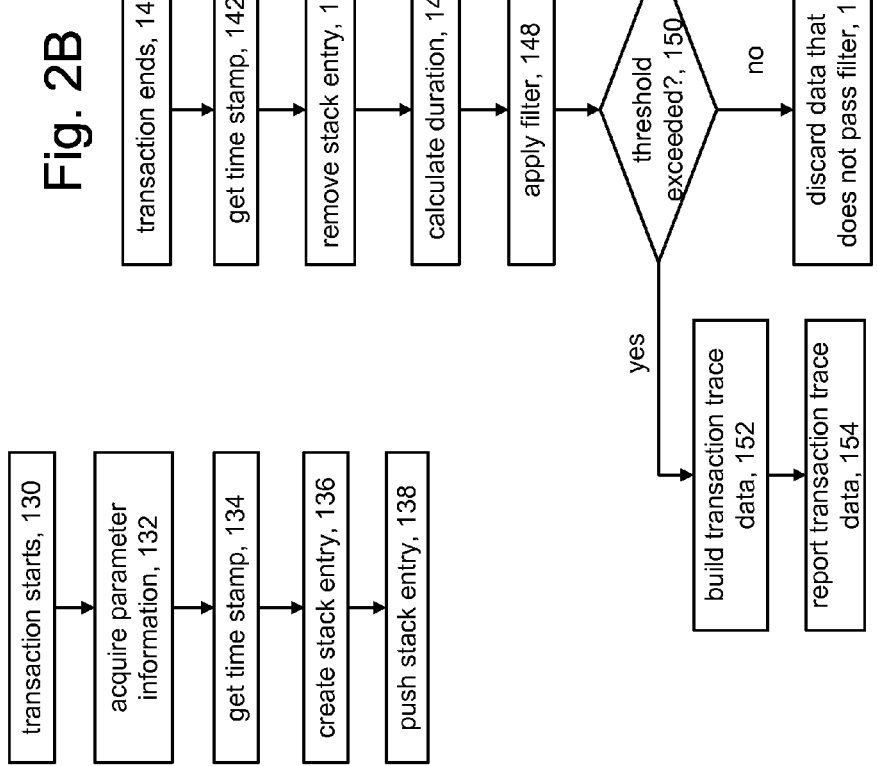

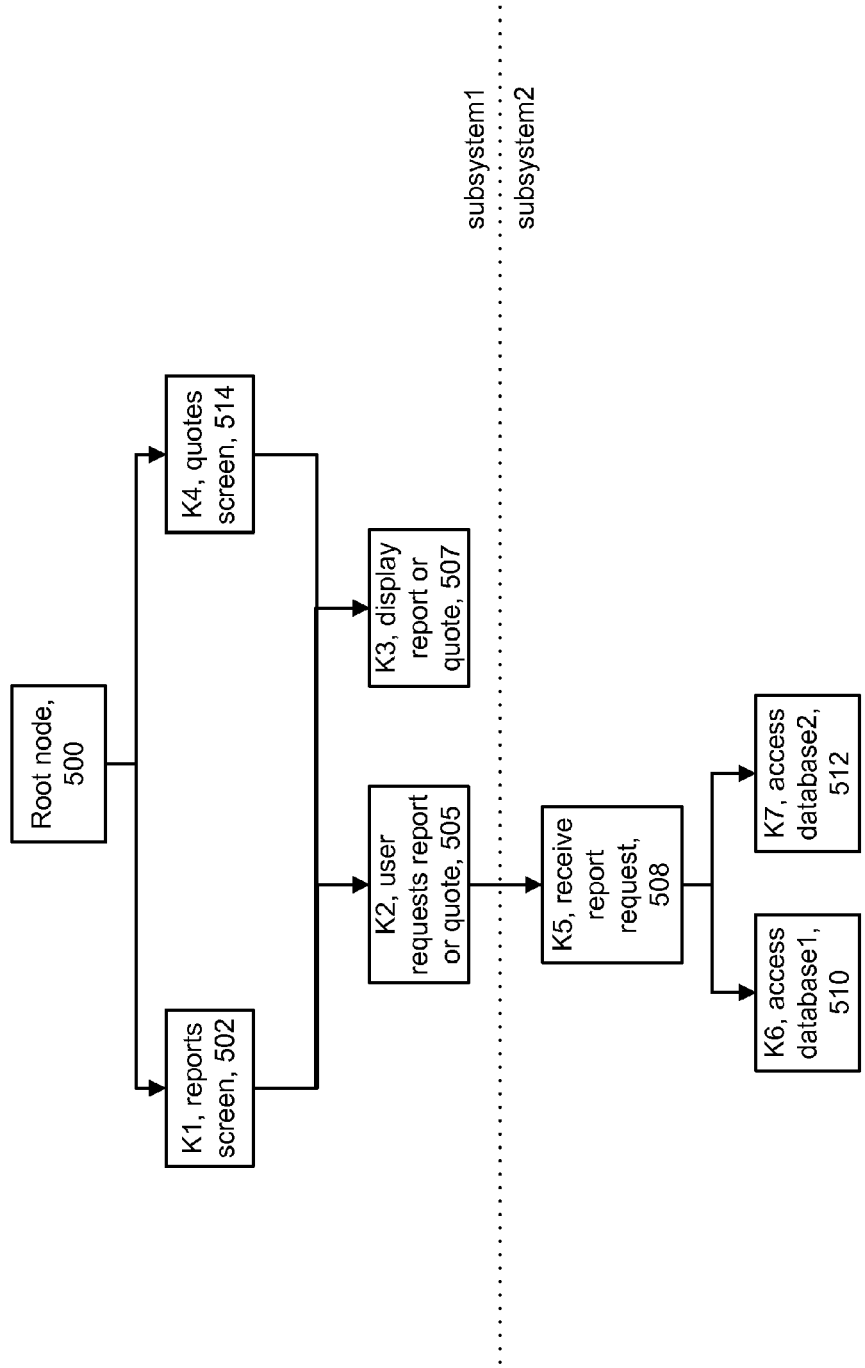

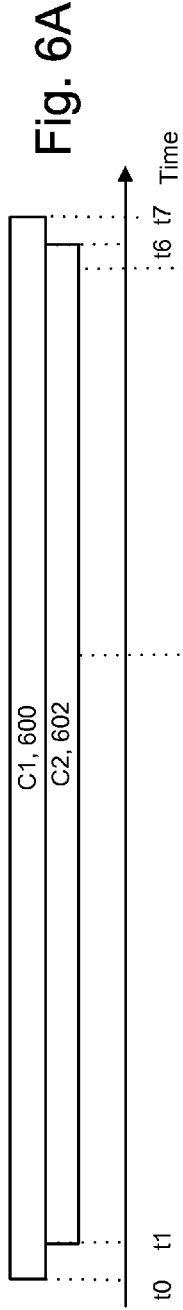
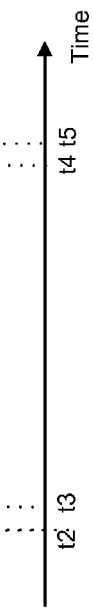
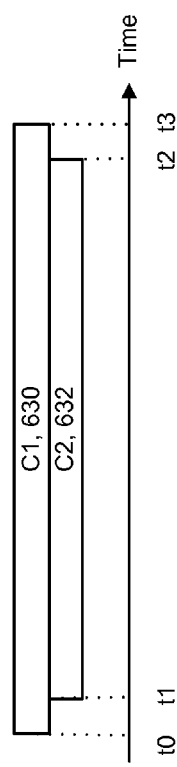
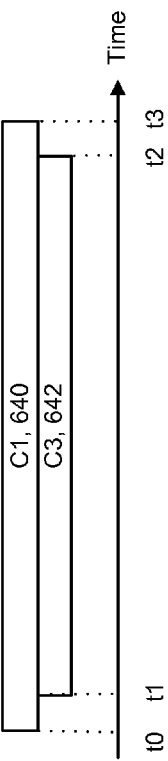

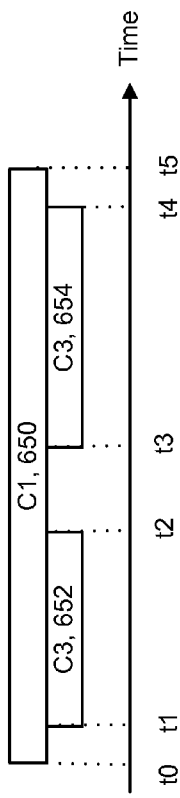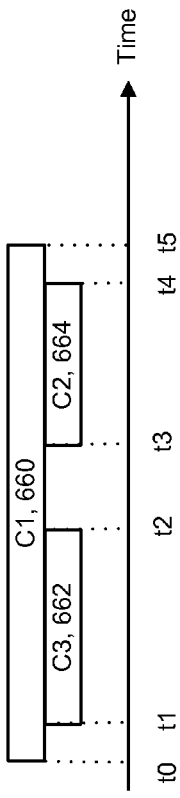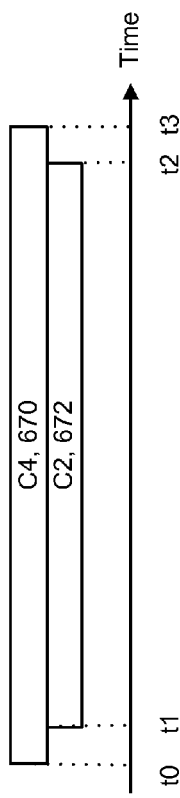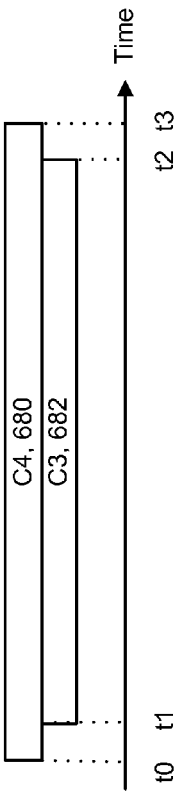

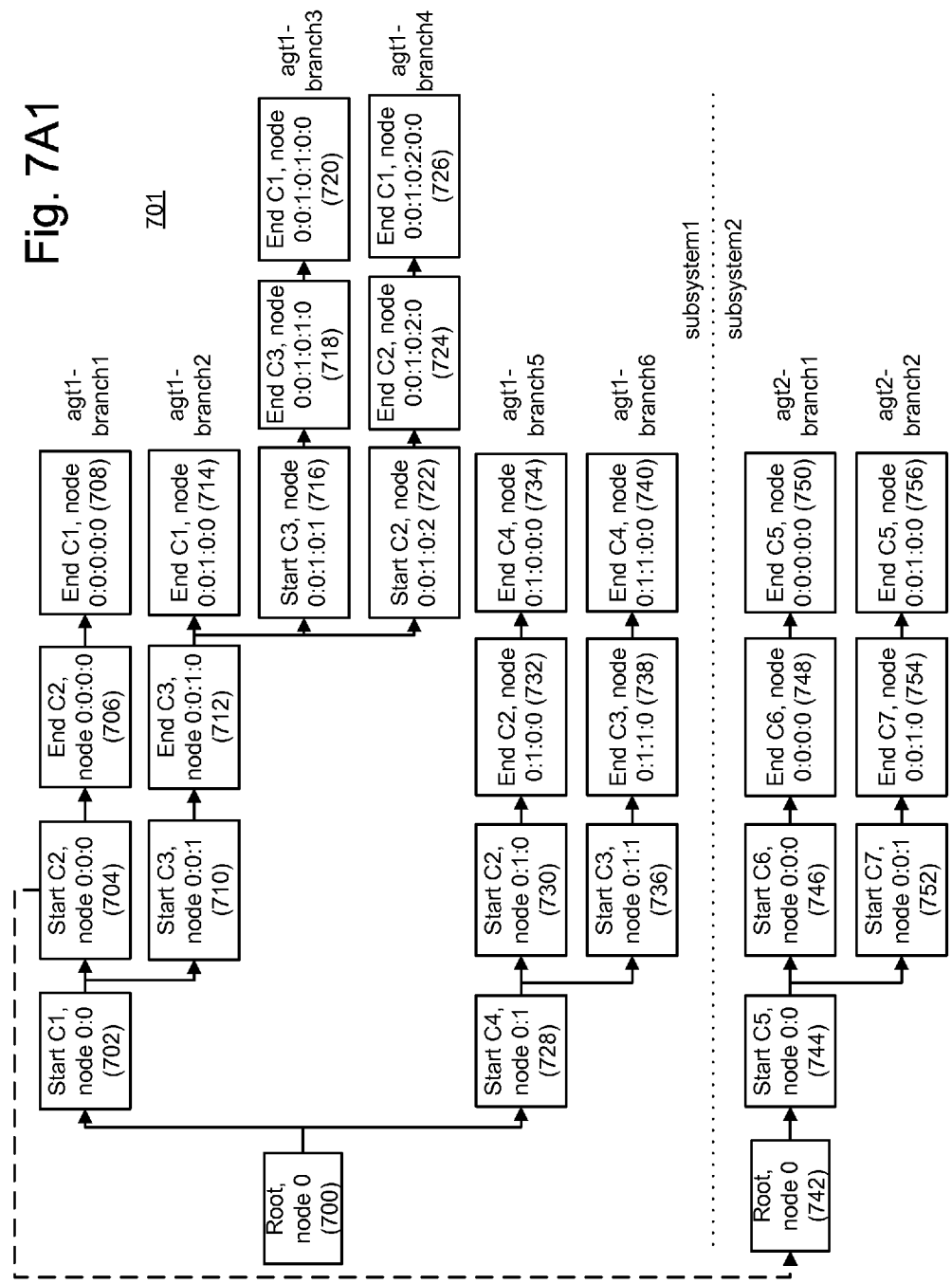
Fig. 7A1

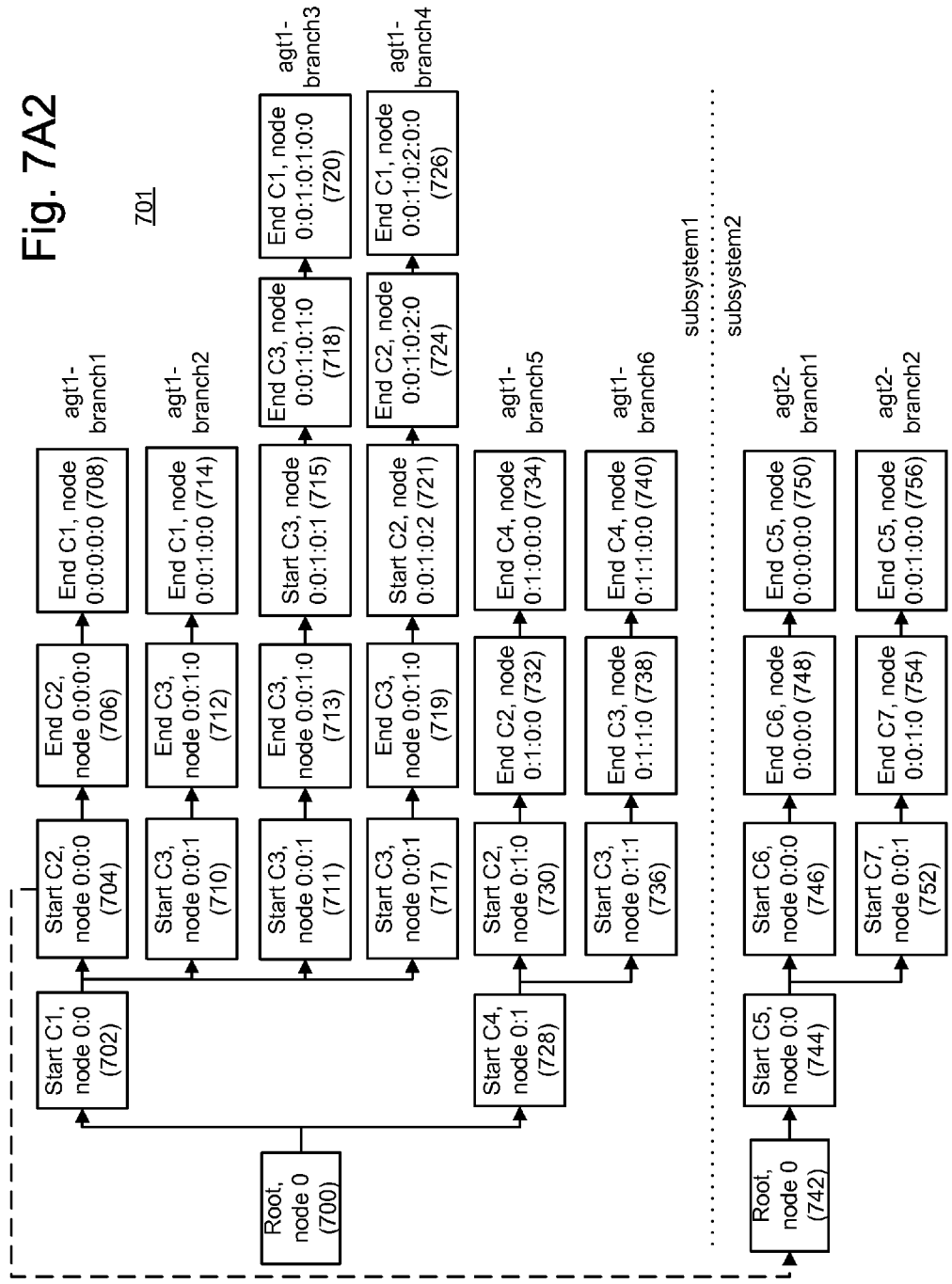
Fig. 7A2

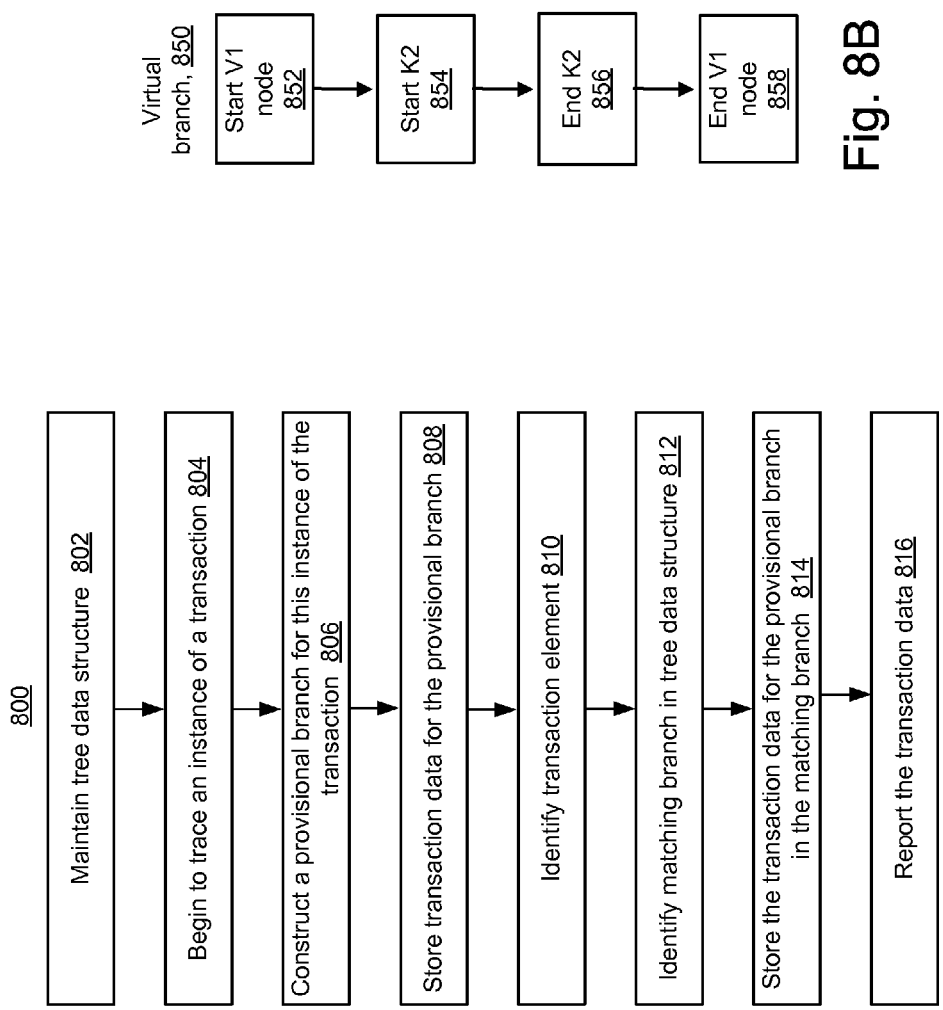

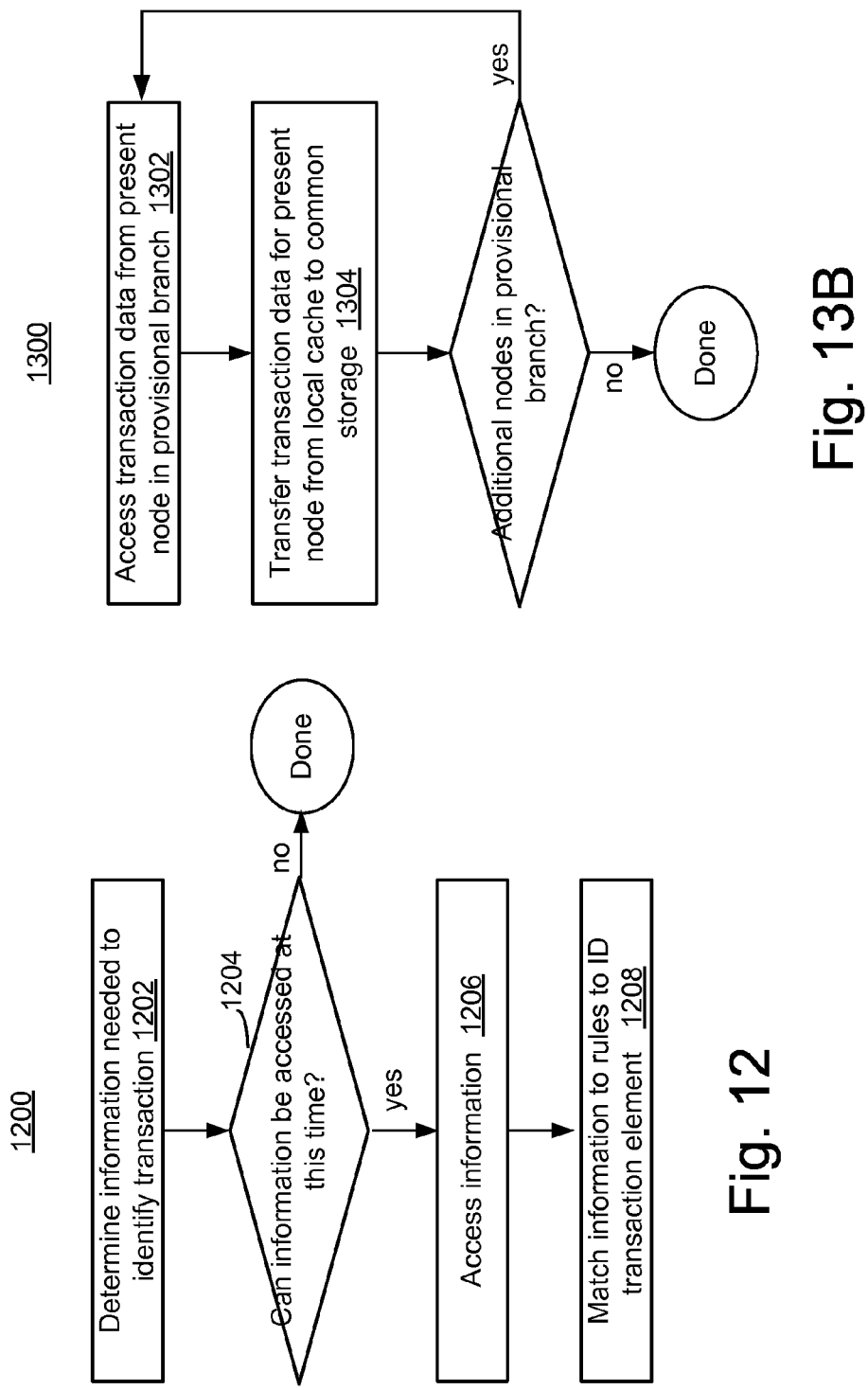

Fig. 14B

Agent-manager last node correspondence

| Node: | Manager Last node of branch: | Agent1 Last node of branch: | Agent2 Last node of branch: |
|---|---|---|---|
| 708 | 0:0:0:0:0:0:0:0 | 0:0:0:0:0 | |
| 792 | 0:0:0:1:0:0:0:0 | 0:0:0:0:0 | |
| 750 | 0:0:0:0:0:0 | | 0:0:0:0:0:0 |
| 756 | 0:0:0:1:0:0 | | 0:0:0:0:0:0 |
| 714 | 0:0:1:0:0 | 0:0:1:0:0 | |
| 720 | 0:0:1:0:1:0:0 | 0:0:1:0:1:0:0 | |
| 726 | 0:0:1:0:2:0:0 | 0:0:1:0:2:0:0 | |
| 734 | 0:1:0:0:0 | 0:1:0:0:0 | |
| 740 | 0:1:1:0:0 | 0:1:1:0:0 | |

Fig. 15A1

Branch definitions-subsystem1

| Last node of branch: | Branch: | Transaction: | Component invocations: |
|---|---|---|---|
| 0:0:0:0:0 | agt1-branch1 | agt1-T1 | start C1, start C2, end C2, end C1 |
| 0:0:1:0:0 | agt1-branch2 | agt1-T2 | start C1, start C3, end C3, end C1 |
| 0:0:1:0:1:0:0 | agt1-branch3 | agt1-T3 | start C1, start C3, end C3, start C3, end C3, end C1 |
| 0:0:1:0:2:0:0 | agt1-branch4 | agt1-T4 | start C1, start C3, end C3, start C2, end C2, end C1 |
| 0:1:0:0 | agt1-branch5 | agt1-T5 | start C4, start C2, end C2, end C4 |
| 0:1:1:0:0 | agt1-branch6 | agt1-T6 | start C4, start C3, end C3, end C4 |

Fig. 15A2

Branch definitions-subsystem2

| Last node of branch: | Branch: | Transaction: | Component invocations: |
|---|---|---|---|
| 0:0:0:0:0 | agt2-branch1 | agt2-T1 | start C5, start C6, end C6, end C5 |
| 0:0:1:0:0 | agt2-branch2 | agt2-T2 | start C5, start C7, end C7, end C5 |

Fig. 15A3

Branch definitions-manager

| Last node of branch: | Branch: | Transaction: | Component invocations: |
|---|---|---|---|
| 0:0:0:0:0:0:0:0 | mgr-branch1 | mgr-T1 | start C1, start C2, start C5, start C6, end C6, end C5, end C2, end C1 |
| 0:0:0:0:1:0:0:0:0 | mgr-branch2 | mgr-T2 | start C1, start C2, start C5, start C7, end C7, end C5, end C2, end C1 |
| 0:0:1:0:0 | mgr-branch3 | mgr-T3 | start C1, start C3, end C3, end C1 |
| 0:0:1:0:1:0:0 | mgr-branch4 | mgr-T4 | start C1, start C3, end C3, start C3, end C3, end C1 |
| 0:0:1:0:2:0:0 | mgr-branch5 | mgr-T5 | start C1, start C3, end C3, start C2, end C2, end C1 |
| 0:1:0:0 | mgr-branch6 | mgr-T6 | start C4, start C2, end C2, end C4 |
| 0:1:1:0:0 | mgr-branch7 | mgr-T7 | start C4, start C3, end C3, end C4 |

Fig. 15B1

References to static data-subsystem1

| Node: | static data: |
|---|---|
| 0:0 | static_data_C1 |
| 0:0:0 | static_data_C2 |
| 0:0:0:0 | static_data_C2 |
| 0:0:0:0:0 | static_data_C1 |
| 0:0:1 | static_data_C3 |
| 0:0:1:0 | static_data_C3 |
| 0:0:1:0:0 | static_data_C1 |
| 0:0:1:0:1 | static_data_C3 |
| 0:0:1:0:1:0 | static_data_C3 |
| 0:0:1:0:1:0:0 | static_data_C1 |
| 0:0:1:0:2 | static_data_C2 |
| 0:0:1:0:2:0 | static_data_C2 |
| 0:0:1:0:2:0:0 | static_data_C1 |
| 0:1 | static_data_C4 |
| 0:1:0 | static_data_C2 |
| 0:1:0:0 | static_data_C2 |
| 0:1:0:0:0 | static_data_C4 |
| 0:1:1 | static_data_C3 |
| 0:1:1:0 | static_data_C3 |
| 0:1:1:0:0 | static_data_C4 |

Fig. 15B2

References to static data-subsytsem2

| Node: | static data: |
|---|---|
| 0:0 | static_data_C5 |
| 0:0:0 | static_data_C6 |
| 0:0:0:0 | static_data_C6 |
| 0:0:0:0:0 | static_data_C5 |
| 0:0:1 | static_data_C7 |
| 0:0:1:0 | static_data_C7 |
| 0:0:1:0:0 | static_data_C5 |

Fig. 15B3

References to static data-subsystem1 for update:

| | |
|---|---|
| 0:0:2 | static_data_C8 |
| 0:0:2:0 | static_data_C8 |
| 0:0:2:0:0 | static_data_C1 |

References to static data-manager

| Node: | static data: |
|---|---|
| 0:0 | static_data_C1 |
| 0:0:0 | static_data_C2 |
| 0:0:0:0 | static_data_C5 |
| 0:0:0:0:0 | static_data_C6 |
| 0:0:0:0:0:0 | static_data_C6 |
| 0:0:0:0:0:0:0 | static_data_C5 |
| 0:0:0:0:0:0:0:0 | static_data_C2 |
| 0:0:0:0:0:0:0:0:0 | static_data_C1 |
| 0:0:0:1 | static_data_C7 |
| 0:0:0:1:0 | static_data_C7 |
| 0:0:0:1:0:0 | static_data_C5 |
| 0:0:0:1:0:0:0 | static_data_C2 |
| 0:0:0:1:0:0:0:0 | static_data_C1 |
| 0:0:1 | static_data_C3 |
| 0:0:1:0 | static_data_C3 |
| 0:0:1:0:0 | static_data_C1 |

| Node: | static data: |
|---|---|
| 0:0:1:0:1 | static_data_C3 |
| 0:0:1:0:1:0 | static_data_C3 |
| 0:0:1:0:1:0:0 | static_data_C1 |
| 0:0:1:0:2 | static_data_C2 |
| 0:0:1:0:2:0 | static_data_C2 |
| 0:0:1:0:2:0:0 | static_data_C1 |
| 0:1 | static_data_C4 |
| 0:1:0 | static_data_C2 |
| 0:1:0:0 | static_data_C2 |
| 0:1:0:0:0 | static_data_C4 |
| 0:1:1 | static_data_C3 |
| 0:1:1:0 | static_data_C3 |
| 0:1:1:0:0 | static_data_C4 |

Fig. 15B4

References to static data-manager for update:

| Node: | static data: |
|---|---|
| 0:0:2 | static_data_C8 |
| 0:0:2:0 | static_data_C8 |
| 0:0:2:0:0 | static_data_C1 |

Fig. 15B5

Dynamic data for example transaction-subsystem1

| Node: | Component: | start/end: | time: | Other dynamic data: |
|---|---|---|---|---|
| 0:0 | C1 | start | t1 | dynamic_data_1 (ex: parameter1 passed in a call) |
| 0:0:0 | C2 | start | t2 | dynamic_data_2 (ex: parameter2 passed in a call) |
| 0:0:0:0 | C2 | end | t3 | dynamic_data_3 (ex: parameter3 passed in a return) |
| 0:0:0:0:0 | C1 | end | t4 | dynamic_data_4 (ex: parameter4 passed in a return) |

Records of static data:

static_data_C1
static_data_C2
static_data_C3
static_data_C4
static_data_C5
static_data_C6
static_data_C7
static_data_C8

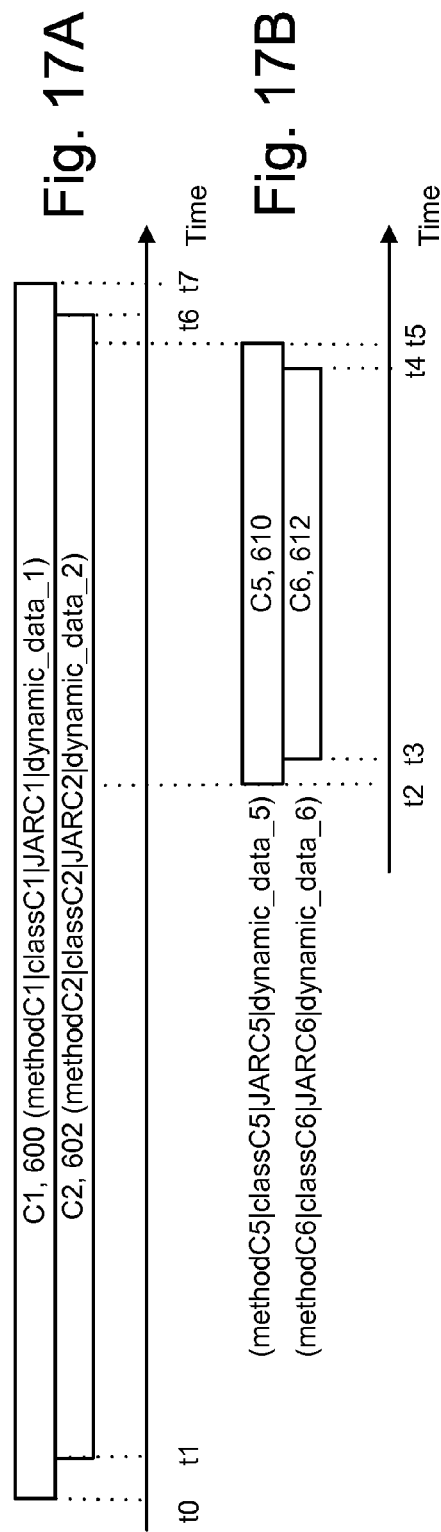

DATA STRUCTURE FOR EFFICIENTLY IDENTIFYING TRANSACTIONS

BACKGROUND

The present disclosure relates to monitoring software in a computing environment. The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. To this end, various application management techniques have been developed.

One approach involves monitoring the infrastructure of the application by collecting application runtime data regarding the individual software components that are invoked in the application. This approach can use agents that essentially live in the system being monitored. For example, using instrumentation of the software, a thread or process can be traced to identify each component that is invoked, as well as to obtain runtime data such as the execution time of each component. Tracing refers to obtaining a detailed record, or trace, of the steps a computer program executes.

BRIEF SUMMARY

According to one aspect of the present disclosure transaction data is reported. A tree data structure comprising branches comprising nodes is maintained. Each branch corresponds to a transaction performed by an application that comprises components. Each node corresponds to an element of a transaction. A provisional branch is constructed comprising nodes that correspond to elements of an instance of a first of the transactions being monitored by an agent. The provisional branch comprises a virtual node for a first transaction element that cannot be identified during monitoring of the instance of the first transaction based on information available to the agent. Transaction data is stored in association with the nodes in the provisional branch during the monitoring. The first transaction element is identified after information needed to identify the first transaction element becomes available to the agent. A branch in the tree data structure that matches the provisional branch is identified after the first transaction element has been identified. The transaction data is reported in response to determining the branch in the tree data structure that matches the provisional branch.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 2A is a flowchart describing one embodiment of a process for starting the tracing of a transaction.

FIG. 2B is a flowchart describing one embodiment of a process for concluding the tracing of a transaction.

FIG. 3 illustrates a computing device of the network of FIG. 1A or 1B.

FIG. 5B illustrates an alternative, more compact, view of the dependency relationships of FIG. 5A.

FIGS. 6A-6I illustrate transaction traces for different sequences of invoked components in the transactions of FIG. 5A.

FIG. 7A1 illustrates an example of tree data structures of agent1 and agent2 which are provided based on the transaction traces of FIGS. 6A-6I.

FIG. 7A2 illustrates an alternative and equivalent view of the tree data structure of FIG. 7A1.

FIG. 8A is a flowchart illustrating a process of reporting transaction data using a tree data structure when a transaction cannot be identified by the agent while tracing the transaction.

FIG. 8B represent a provisional branch that may be constructed during the process of FIG. 8A.

FIGS. 10A and 10B each show example web pages.

FIG. 12 is a flowchart of one embodiment of a process of attempting to identify a transaction element.

FIG. 13B is a flowchart of one embodiment of a process of transferring transaction data from thread local storage to agent common storage.

FIG. 14B illustrates a correspondence between a last node in the tree data structure of agent1 of FIG. 7A1 and a last node of the manager tree data structure of FIG. 14A.

FIG. 15A1 illustrates a record of branches and component invocations for subsystem1 in the tree data structure of FIG. 7A1.

FIG. 15A2 illustrates a record of branches and component invocations for subsystem2 in the tree data structure of FIG. 7A1.

FIG. 15A3 illustrates a combined record of branches and component invocations stored at the manager in the tree data structure of FIG. 7A1.

FIG. 15B1 illustrates a record of references to static data for different nodes/components of subsystem1 in the tree data structure of FIG. 7A1.

FIG. 15B2 illustrates a record of references to static data for different nodes/components of subsystem2 in the tree data structure of FIG. 7A1.

FIG. 15B3 illustrates an update to the record of FIG. 15B1 for agt1-new-branch in FIG. 9B.

FIG. 15B4 illustrates a record of references to static data for different nodes/components of a manager in the tree data structure of FIG. 14A.

FIG. 15B5 illustrates an update to the record of FIG. 15B4 for mgr-new-branch7 in FIG. 14C.

FIG. 15C illustrates a record of dynamic data from tracing details for different nodes/components of subsystem1 of the tree data structure of FIG. 7A1.

FIG. 15D illustrates records of static data associated with different components.

FIG. 17A illustrates the transaction trace of FIG. 6A with annotation using static and dynamic data.

FIG. 17B illustrates the transaction trace of FIG. 6A with annotation using static and dynamic data.

DETAILED DESCRIPTION

Figure 1A:
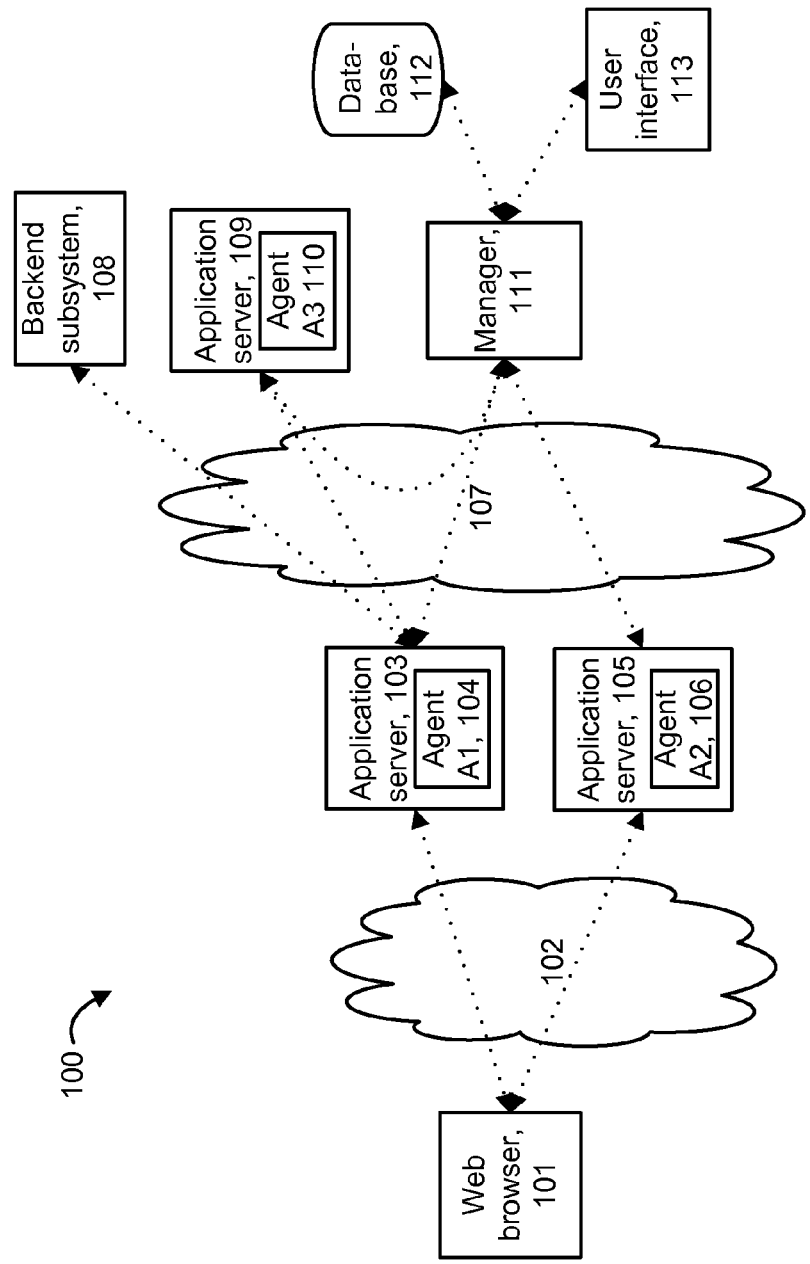
FIG. 1A illustrates an example system in which multiple instances of an application run on different servers, and agents of the servers report to a manager.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure provides a technique for monitoring software which efficiently communicates transaction trace data, including static and dynamic data, from an agent to a manager. To improve efficiency and reduce overhead costs, a tree data structure maintained by an agent and a manager describes transactions as a sequence of transaction elements. A given branch of the tree represents one transaction, in one embodiment. The nodes along that branch may correspond to elements of the transaction. The nodes may be associated with components of the application that are invoked to perform the transaction. In one embodiment, there is a start node and an end node associated with each invoked component.

To identify a transaction to a manager, the agent can communicate a unique identifier of the branch, such as an identifier of a last node of the branch. This allows the sequence of invoked components to be reported efficiently from the agent to the manager. Further, static data can be indexed to one or more of the nodes, and accessed by the agent and/or manager. Static data typically is fixed for a given version of software, and can also be thought of as fixed or execution-independent data. The static data can include, e.g., a class name or method name associated with a component, a sequence of method calls, a name of an archive file (such as a JAVA Archive file or .JAR file or a Web Archive file or .WAR file) from which a traced class file is deployed, a text string, a component type (e.g., servlet, EJB), a port number for a servlet or a socket, a URL, a host name, and a local or remote interface name. These are all types of information which are available from tracing the software. The indexing of the static data avoids the need to repeatedly communicate the static data from the agent to the manager, and the need for the agent and/or manager to repeatedly obtain the static data.

Dynamic data can also be reported from the agent to the manager. Dynamic data can include start and end times of components, and other dynamic data such as a value of a parameter passed to or by a monitored method. The dynamic data can also be indexed to one or more nodes. The dynamic data could be indexed to the start and/or end nodes associated with a component. Through this indexing, the dynamic data can be reported efficiently from the agent to the manager.

In one embodiment, a tree data structure is learned over time based on monitoring transactions. When a transaction is traced, the agent may construct an isolated branch based on transaction elements that it identifies. After the transaction completes, the agent can identify a branch in the tree data structure that matches the isolated branch. If there is no match, the agent may update the tree data structure and report the update to the manager, so that the agent and manager can maintain synchronized versions of the tree data structure. Further, the manager can maintain a tree data structure based on reports from multiple agents, where different portions of the tree data structure are associated with different agents. The manager can also pass on an update which is received from one agent to another agent, when the agents monitor different instances of the same software. In this way, new transactions can be propagated quickly among agents so that the tree data structures of the agents are synchronized.

One technique for detecting a transaction element is based on transaction definitions which specify the existence or non-existence or combination thereof of a set of name/value pairs, e.g., parameters, which are found in the traffic. For example, parameter specifications may include a matching type, a parameter type (e.g., URL, cookie, post, or query, or session), a name pattern, and a value pattern. URL parameters include name/value pairs that appear in the HTTP request line before the first "?" character or in special request headers such as the Host: request header. Cookie parameters include name/value pairs that appear in the Cookie: request header. Post parameters include name/value pairs that appear in the HTTP POST request-body. Query parameters include name/value pairs that appear in the HTTP request line after the first "?" character. Name and value specifications may specify an exact value for exact matching or a pattern for pattern matching.

In some circumstances, the agent may not be able to identify a transaction element while the transaction is executing. As one example, in order to identify a transaction element, POST parameters may need to be matched to some string. However, the act of accessing the POST parameters by the agent during transaction execution could corrupt the data stream. As one example, a reason for this is that the Java API for evaluating parameters, javax.servlet.ServletRequest.getParameterMap( ), cannot be safely called by the agent until the method completes. Invoking this method by the agent (and methods with similar capabilities) may cause the input stream to become unusable by the application, and it may affect the stream encoding. Therefore, obtaining the transaction element at the method start could break the application. Other Java methods that may cause similar problems include, but are not limited to, getParameter, getParameterNames, and getParameterValues. If the agent were to invoke one of these methods during transaction execution it could make the agent less than completely transparent to the application, which could decrease the business value of the agent.

In one embodiment, when the information to determine a transaction element is not accessible to the agent during execution of the transaction, the agent constructs a provisional branch. By information not being accessible it is meant that either the information is not safely accessible or is completely inaccessible. An example in which the information is not safely accessible is when the transaction identity depends on HTTP POST parameters that cannot be safely accessed by the agent, at least initially. An example in which the information is completely inaccessible, at least initially, is when the transaction identity depends on a reply that is sent after completion of at least a portion of the transaction.

The provisional branch may have a virtual node that acts as a placeholder for a transaction element that cannot be identified by the agent when tracing the transaction. In one embodiment, the provisional branch is stored in memory owned by a thread that executes the transaction. As the transaction is traced, additional nodes may be added to the provisional branch for transaction elements that can be identified. Dynamic data may be associated with both the provisional node and other nodes as the transaction is traced. When the information to identify the transaction element becomes available, the provisional node may updated based on the identified transaction element. The provisional branch may then be replayed against a tree data structure to transfer the traced data to a common storage area. This allows the transaction to be traced efficiently.

As one example, the transaction element for the virtual node might be initially un-identifiable because it cannot be safely determined whether HTTP POST parameters are "buy" or "sell." Post parameters of "buy" may correspond to a node in one branch of the tree data structure, whereas POST parameters of "sell" may correspond to a node in another branch of the tree data structure. Therefore, a "provisional branch" may be constructed during tracing of the transaction. After the transaction completes, the POST parameters may be analyzed to identify the transaction element. Thus, the virtual node can be updated based on the POST parameters. Then, the agent can match the updated provisional branch to a branch in the tree data structure.

Referring now to FIG. 1A, an example system 100 in which embodiments may be practiced is illustrated. FIG. 1A depicts an example system 100 in which multiple instances of an application run on different servers, and agents of the servers report to a manager. Example managed computing devices 103, 105 and 109 may include application servers or any other type of computing device having a processor for executing code to achieve a desired functionality. The managed computing devices can be located remotely from one another or co-located. The managed computing devices communicate with a manager computer 111 via a network 107 in this example. The manager computer 111 can be local to, or remote from, the managed computing devices. The managed computing devices 103 and 105 also communicate with client computing devices such as an example web browser 101 via a network 102. The web browser 101 may access the network 102 via an Internet Service Provider, for instance. Further, as an example, the managed computing device 103 calls the managed computing device 109, such as via a Web Services call or EJB Client, to obtain information which is needed to respond to a request from the web browser. The managed computing device 103 can also call a backend system 108 such as a mainframe, database or some other un-instrumented computing device, to obtain information which is needed to respond to a request from the web browser. While a full range of performance metrics can be obtained from a managed computing device due to the use of instrumentation, limited information may be obtained regarding an un-instrumented subsystem from the methods that are used to call out to them from the managed computing device. The managed computing devices may be considered to be front end subsystems. The networks 102 and 107 can be the same, overlapping or distinct, and can include, e.g., the Internet, another wide area network, and/or a local area network. The dotted lines indicate communication paths.

For example, a corporation running an enterprise application such as a web-based e-commerce application may employ a number of application servers at one location for load balancing. Requests from users, such as from the example web browser 101, are received via the network 102, and can be routed to any of the managed computing devices 103 and 105. Agent software running on the managed computing devices 103, 105 and 109, denoted by Agent A1 (104), Agent A2 (106) and Agent A3 (110), respectively, gather information from an application, middleware or other software running on the respective managed computing devices. Such information may be obtained using instrumentation, one example of which is byte code instrumentation. However, the gathered data may be obtained in other ways as well. The agents essentially live in the computing device being monitored and provide a data acquisition point. The agents organize and optimize the data communicated to the manager 124. In one embodiment, different instances of the same application run at the managed computing devices 103 and 105, while another application runs at the managed computing device 109.

The manager 111 can be provided on a separate computing device such as a workstation which communicates with a user interface 113, such as a monitor, to display information based on data received from the agents. The manager can also access a database 112 to store the data received from the agents. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The manager 111 and user interface display 113 might be provided at a corporate headquarters location. Other applications which are not necessarily web-based or involve retail or other sales similarly employ agents and managers for managing their systems. For example, a bank may use an application for processing checks and credit accounts. Moreover, in addition to the multi-computing device arrangements mentioned, a single computing device can be monitored as well with one or more agents.

Various approaches are known for instrumenting software to monitor its execution. For example, tracing may be used to track the execution of software. One example of tracing is discussed in U.S. Pat. No. 7,870,431, issued Jan. 11, 2011, titled "Transaction Tracer," and incorporated herein by reference. In one approach discussed therein, object code or bytecode of an application to be monitored is instrumented, e.g., modified, with probes. The probes measure specific pieces of information about the application without changing the application's business or other logic. Once the probes have been installed in the bytecode of an application, it may be referred to as a managed application, and a computing device on which the application runs may be referred to as a managed computing device. The agent software receives information from the probes and may communicate the information to another process, such as at the manager 111, or process the information locally, such as to determine whether the information indicates an abnormal condition. The agent thus collects and summarizes information received from the probes. The probes collect information as may be defined by a directives file. For example, the information from the probes may indicate start and stop times of a transaction or other execution flow, or of individual components within a transaction/execution flow. This information can be compared to pre-established criteria to determine if it is within bounds. If the information is not within bounds, the agent can report this fact to the manager so that appropriate troubleshooting can be performed. The agents are typically aware of the software executing on the local managed computing device with which they are associated.

The probes can report a standard set of metrics which may include: CORBA method timers, Remote Method Invocation (RMI) method timers, thread counters, network bandwidth, JDBC update and query timers, servlet timers, Java Server Pages (JSP) timers, system logs, file system input and output bandwidth meters, available and used memory and EJB (Enterprise JavaBean) timers. A metric is a measurement of a specific application activity.

An agent reports information about transactions, which may identify resources which are accessed by an application. In one approach, when reporting about transactions, the word Called designates a resource. This resource is a resource (or a sub-resource) of a parent component, which may be a consumer. For example, assume that Servlet A is the first component invoked in a transaction. Under the consumer Servlet A, there may be a sub-resource Called EJB. Consumers and resources can be reported by the agent in a tree-like manner. Data for a transaction can also be stored according to the tree data structure. For example, if a Servlet (e.g. Servlet A) is a consumer of a network socket (e.g. Socket C) and is also a consumer of an EJB (e.g. EJB B), which in turn is a consumer of a JDBC (e.g. JDBC D), the tree might look something like the following:

---

Servlet A
  Data for Servlet A
  Called EJB B
    Data for EJB B
    Called JDBC D
      Data for JDBC D Called Socket C
Data for Socket C In one embodiment, the above tree is stored by the Agent in a stack. When transactions are started, they may be pushed onto the stack. When transactions are completed, they are popped off the stack. In one embodiment, each transaction on the stack has the following information stored: type of transaction, a name used by the system for that transaction, a hash map or dictionary of parameters, a timestamp for when the transaction was pushed onto the stack, and sub-elements. Sub-elements may be stack entries for other components (e.g. methods, process, procedure, function, thread, set of instructions, etc.) that are started from within the transaction of interest. Using the tree as an example above, the stack entry for Servlet A would have two sub-elements. The first sub-element would be an entry for EJB B and the second sub-element would be an entry for Socket Space C. Even though a sub-element is part of an entry for a particular transaction, the sub-element will also have its own stack entry. An example of an entry point to a transaction/branch is a URL. As the tree above notes, EJB B is a sub-element of Servlet A and also has its own entry. The top (or initial) entry (e.g., Servlet A) for a transaction, is called the root component. Each of the entries on the stack is an object.

Figure 1B:
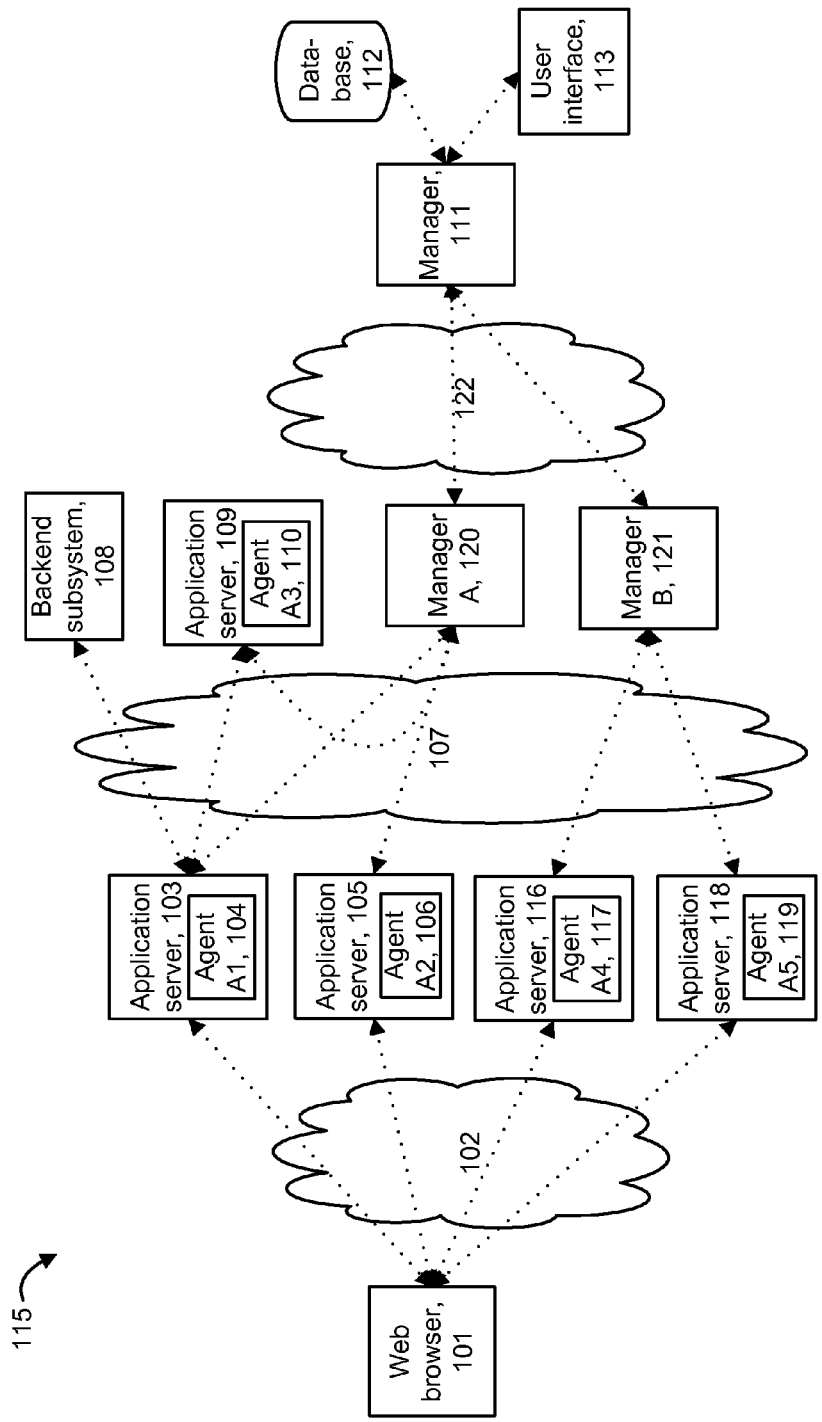
FIG. 1B illustrates an example system in which multiple instances of an application run on different servers, and agents of the servers report to a manager via intermediate collectors.

FIG. 1B depicts an example system 115 in which multiple instances of an application run on different servers, and agents of the servers report to a manager via intermediate managers. In this example, additional managed computing devices 116 and 118 with agent A4 117 and agent A5 119, respectively, are provided. Further, intermediate, or low level, manager computing devices 120 (manager A) and 121 (manager B) are provided which receive data from agent A4 and agent A5, respectively. The intermediate managers in turn report the data to the manager 111 which, in this case, is a high level manager, via a network 122. Networks 102, 107 and 122 can be the same, overlapping or distinct.

FIG. 2A is a flowchart describing one embodiment of a process for starting the tracing of a transaction. The steps are performed by the appropriate Agent(s). In step 130, an instance of a transaction starts. In one embodiment, the process is triggered by the start of a method (e.g., the calling of a "loadTracer" method). Note that at the time that transaction tracing starts, the type of transaction might not be known. For example, it might not be known whether this is a buy transaction or a sell transaction. However, tracing of the transaction may proceed using a provisional branch of a tree data structure, in one embodiment. Further details are discussed below.

In step 132, the Agent acquires the desired parameter information. In one embodiment, a user can configure which parameter information is to be acquired via a configuration file or a UI. The acquired parameters may be stored in a hash map or dictionary, which is part of the object pushed onto the stack. In other embodiments, the identification of parameters is pre-configured. There are many different parameters that can be stored. In one embodiment, the actual list of parameters used is dependent on the application being monitored. The table below provides examples of some parameters that can be acquired.

| Parameters | Appears in | Value |
| --- | --- | --- |
| UserID | Servlet, JSP | The UserID of the end-user invoking the http servlet request. |
| URL | Servlet, JSP | The URL passed through to the servlet or JSP, not including the Query String. |
| URL Query | Servlet, JSP | The portion of the URL that specifies query parameters in the http request (text that follows the '?' delimiter). |
| Dynamic SQL | Dynamic JDBC Statements | The dynamic SQL statement, either in a generalized form or with all the specific parameters from the current invocation. |
| Method | Method timers (everything but Servlets, JSP's and JDBC Statements) | The name of the traced method. If the traced method directly calls another method within the same component, only the "outermost" first encountered method is captured. |
| Callable SQL | Callable JDBC statements | The callable SQL statement, either in a generalized form or with all the specific parameters from the current invocation. |
| Prepared SQL | Prepared JDBC statements | The prepared SQL statement, either in a generalized form or with all the specific parameters from the current invocation. |
| Object | All non-static methods | toString( ) of the this object of the traced component, truncated to some upper limit of characters. |
| Class Name | All | Fully qualified name of the class of the traced component. |
| Param_n | All objects with WithParams custom tracers | toString( ) of the nth parameter passed to the traced method of the component. |
| Primary Key | Entity Beans | toString( ) of the entity bean's property key, truncated to some upper limit of characters. |

Parameters can include query, cookie, post, URL and session type name/value pairs. Note the some parameters may be obtainable while the transaction executes, whereas others may not be obtainable until after the transaction completes. As one example, POST parameters may not be available until the transaction, or at least one of the software components associated with the transaction, completes.

In step 134, the system acquires a timestamp indicating the current time. In step 136, a stack entry is created. In step 138, the stack entry is pushed onto the stack. In one embodiment, the timestamp is added as part of step 138. The process is performed when a transaction is started. A similar process may be performed when a sub-element of the transaction starts (e.g., EJB B is a sub-resource of Servlet A—see tree described above).

FIG. 2B is a flowchart describing one embodiment of a process for concluding the tracing of an instance of a transaction. The process may be performed by an Agent when the instance of the transaction ends. In step 140, the process is triggered by a transaction ending. The transaction may end when one of the methods associated with the transaction ends. This final method could be instrumented to execute code that finalizes the tracing (e.g., a "finishTrace" method may be called). In step 142, the system acquires the current time. In step 144, the stack entry is removed. In step 146, the execution time of the transaction is calculated by comparing the timestamp from step 142 to the timestamp stored in the stack entry. In step 148, the filter for the trace is applied. For example, the filter may include a threshold period of one second. Thus, step 148, may include determining whether the calculated duration from step 146 is greater than one second. If the threshold is not exceeded (step 150), then the data for the transaction may be discarded. In one embodiment, the entire stack entry is discarded. In another embodiment, only the parameters and timestamps are discarded. In other embodiments, various subsets of data can be discarded. In some embodiments, if the threshold period is not exceeded then the data is not transmitted by the Agent to other components in the system of FIG. 1A or 1B. If the duration exceeds the threshold (step 150), then the Agent builds transaction trace data in step 160. Transaction trace data is the data about a transaction that will be reported. In one embodiment, the transaction trace data includes the name of the transaction, the type of the transaction, the start time of the transaction, the duration of the transaction, a hash map or dictionary of the parameters, and all of the sub-elements (which can be a recursive list of elements). Other information can also be part of the transaction trace data. In step 162, the Agent reports the transaction trace data by sending the transaction trace data via the TCP/IP protocol to the manager 111.

FIG. 2B represents what happens when an instance of a transaction finishes. When a sub-element finishes (e.g., Called EJB B in the structure above), however, the steps performed include getting a time stamp, removing the stack entry for the sub-element and adding the completed sub-element to previous stack entry. In one embodiment, the filters and decision logic are applied to the start and end of the transaction, rather than to a specific sub-element.

Note, in one embodiment, if the transaction tracer is off, the system will still use the stack; however, parameters will not be stored and no transaction trace data will be created. In some embodiments, the system defaults to starting with the tracing technology off. In some embodiments, the tracing only starts after a user requests it, as described above.

FIG. 3 depicts a computing device of the network of FIG. 1A or 1B. The computing device 300 is a simplified representation of a system which might be used as one of the web browsers, application server, managers and/or user interfaces, such as discussed in connection with FIG. 1A or 1B. The computing device 300 includes storage device 310, a network interface 320 for communicating with other computing devices, a processor 330 for executing software instructions, a working memory 340 such as RAM for storing the software instructions after they are loaded from the storage device 310, for instance, and a user interface display 350 such as one or more video monitors. A user interface can be provided one or more monitors. The user interface display 350 can provide information to a human operator based on the data received from one or more agents. The user interface display 350 can use any known display scheme, whether graphical, tabular or the like. In addition to an on-screen display, an output such as a hard copy such from a printer can be provided.

Both the storage device 310 and the working memory 340 are examples of computer readable storage media. Storage device 310 may include, but is not limited to, a portable computer diskette, a hard disk, a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. The storage device 310 and working memory 340 may be considered to be a tangible processor-readable storage device having processor readable code embodied thereon for programming the processor 330 to provide functionality discussed herein.

A database may be included in the storage device 310 when the storage device 310 is part of a computing device 300 such as an application server, manager and/or user interfaces. The storage device 310 can represent one or more storage devices which store data received from one or more agents, and which can be accessed to obtain data to provide a user interface as described herein. The storage device 310 can represent a data store.

Figure 4A:
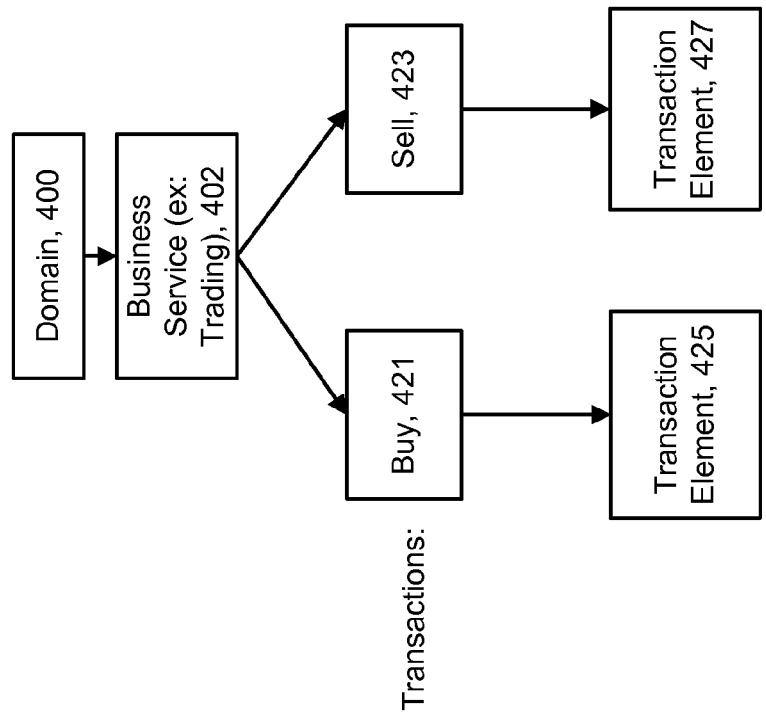
FIG. 4A illustrates a hierarchy for use in describing the operation of one or more applications.

FIG. 4A depicts a hierarchy for use in describing the operation of one or more applications. The different levels of the hierarchy can be defined based on any desired organizational structure. For example, the hierarchy can include human-facing terminology, that is, terminology which facilitates understanding of client's interactions with a monitored application. A hierarchy may encompass any type of interaction with an application, whether the interaction is in the realm of a for-profit business, such as for e-commerce transactions, educational organization or government organization, for instance. Further, the one or more hierarchies can include nodes at different levels of the one or more hierarchies, where each node has a descriptive name. The hierarchy can be considered to be an abstract construct which provides a way to organize information about how an application executes in a manner which is more understandable to the human operator.

A top level of the hierarchy is a domain level 400 named "Domain." A next level of the hierarchy is a Business Service level 402. An example of a Business Service relates to trading a stock using a web site. Thus, "Trading" can be the name of a node at the Business Service level of the hierarchy. A next level of the hierarchy is a Transaction level. A Business Service can be made up of a number of Transactions. In one embodiment, the Transactions are Business Transactions. For example, for Trading, the Transactions can include Reports 404 (e.g., view a report regarding a stock or an account) and Quotes 406 (e.g., obtain a quote for a stock price). A Transaction can be defined based on one or more Transaction Elements. In one approach, a Transaction has only one transaction element.

In one embodiment, a transaction is represented a sequence of transaction elements. The transaction elements may be associated with software components which are invoked in response to a request from a client, to provide a corresponding response to the client. For example, the components may be components of an application which are recognizable and measurable by a server, such as a servlet or EJB.

In one embodiment, a user defines transaction elements by specifying rules. A Transaction Element can be identified by determining when information collected by an agent match the rules. A transaction element definition can include, e.g., a specified URL host name, URL parameters, HTTP POST parameters, cookie and/or session manager parameters. Additionally, or alternatively, the definition may require a transaction to start with a specified URL host name. The agent or manager, for instance, can compare the information against the rules to determine when a Transaction Element is present in a Transaction. A Transaction Element can in some cases be identified by matching parameters. For example, POST parameters can be matched to some string. If a match is found, this identifies a particular transaction element.

In some cases, the transaction element cannot be determined based on information available to the agent while the transaction is being traced. Note that the agent may not have access to the needed information while initially tracing the transaction, although the information could become accessible at a later point while still tracing the transaction. As one example, it may not be safe for the agent to obtain and match POST parameters, at least while the transaction is initially being traced. In one embodiment, when the transaction element cannot be identified, or is ambiguous, a virtual node is created to store transaction data associated with the transaction element. The virtual node may be part of a provisional branch that includes other nodes corresponding to transaction elements that can be identified. Later, when the transaction element can be identified, the provisional branch may be updated. In one embodiment, the transaction data that was stored for the provisional branch may be transferred to a common storage area. The data in the common storage area may be efficiently reported from the agent to the manager.

Figure 4B:
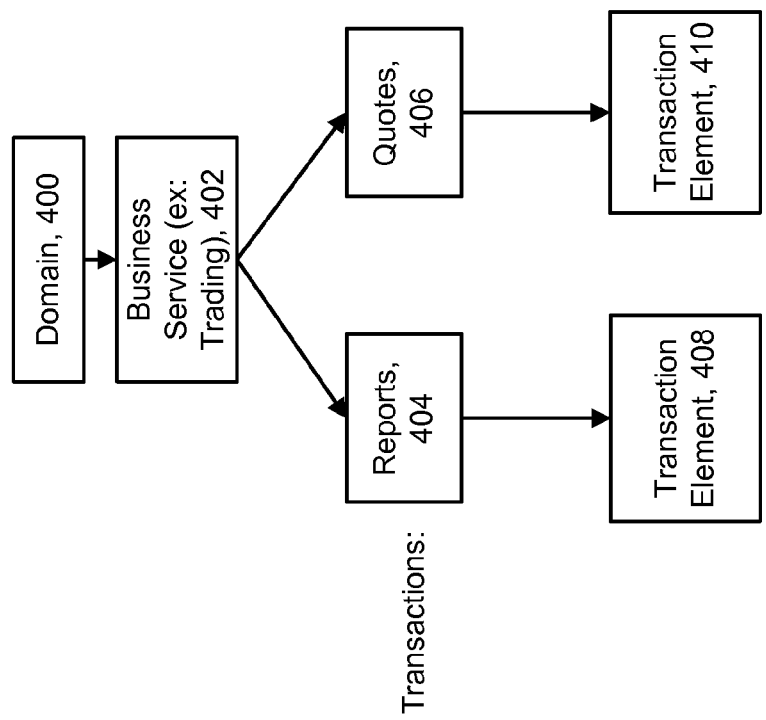
FIG. 4B illustrates another hierarchy for use in describing the operation of one or more applications.

FIG. 4B depicts another example hierarchy for use in describing the operation of one or more applications. This example differs from FIG. 4A in that instead of report transaction 404 and a quote transaction 406, there is a buy transaction 421 and a sell transaction 427. The buy transaction 421 may have one or more transaction elements 425. The sell transaction 423 may have one or more transaction elements 427. For purposes of discussion, the buy transaction 421 and sell transaction 423 will be used as an example for which a transaction element cannot be determined based on information available to the agent while the transaction is being traced.

Figure 5A:
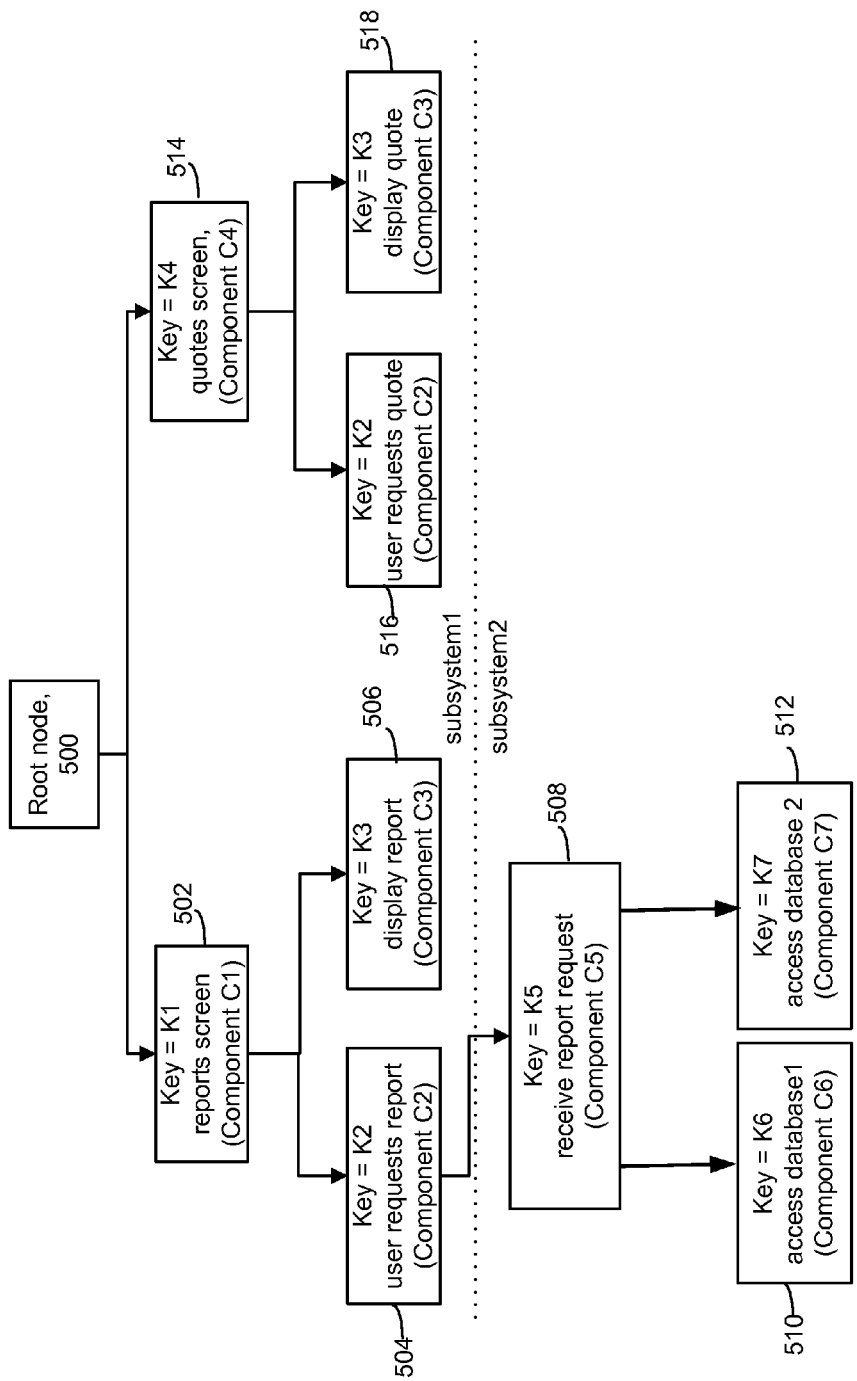
FIG. 5A illustrates dependency relationships in an example sequence of components invoked in the Reports and Quotes Business Transactions of FIG. 4A.

FIG. 5A depicts dependency relationships in an example sequence of transaction elements associated with the Reports and Quotes Transactions of FIG. 4A. The transaction elements are depicted as blocks in a flow path. The transaction elements can be associated with different subsystems, namely subsystem1 (transaction elements above the dotted line) or subsystem2 (transaction elements below the dotted line).

This example provides details of the Reports and Quotes Transactions discussed previously. Similar dependency relationships might be shown for the Buy and Sell Transactions of FIG. 4B. In this example, each transaction element is associated with a component, which may be a software component of the application being monitored. In one possible implementation, each component is associated with one or more class-method pairs. For example, a servlet is a JAVA class. It is an object that receives a request and generates a corresponding response. A class-method pair can be represented by the notation class.method. For example, Transaction Element 502 could be associated with a component which displays a reports screen on a user interface (UI) to receive a user's input regarding a desired report. An example format of a class-method pair for C1 is ServletA1.DisplayReportScreen. Element 502 is under a root 500.

Each transaction element is labeled with a key (K1-K7) in FIG. 5A. In some cases, the agent is able to uniquely identify the key while the transaction is executing. For example, the transaction element may have been defined such that invocation of a particular EJB indicates a certain transaction element. Thus, when the EJB is invoked, the agent is able to uniquely identify this particular transaction element.

However, in other cases, the agent is not able to uniquely identify the key, for at least a portion of the time while the transaction is traced. Therefore, the agent is unable to identify the transaction element. For example, the identity of the transaction element may depend on POST parameters, which may not be accessible when the transaction is being traced. As one example, a POST parameter of sell might indicate Key K1, whereas a POST parameter of buy might indicate Key K4.

The various transaction elements in FIG. 5A are each associated with a particular software component, in one embodiment. For convenience of discussion, the name for the component associated with the transaction element will be based off the key. For example, transaction element 502 has a key K1 and is associated with component C1. Note, however, that a given software component might be associated with different keys. For example, component C1 might be associated with both key K1 and K4 (not depicted in FIG. 5A). It may be that the agent needs to access POST parameters to determine whether the invocation of component C1 should be transaction 502 or transaction 514.

The component C1 (associated with transaction element 502) can call C2 (associated with transaction element 504) which relates to a requested report. Component C2 could include a class-method pair such as ServletA2.RequestedReport which processes a user input of a requested report. This processing could include checking the format of the request, for instance, and, if the format is valid, making a call to a component C5 (associated with transaction element 508) in subsystem2, which receives the report request. For instance, this call may be a cross-process, cross-thread transaction or cross-subsystem call. If the format is invalid, the control flow returns to component C1, which may call component C3 (associated with transaction element 508) to display an error message, for instance.

An example format of a class-method pair for component C5 is ServletA3.ReceiveReportRequest. Component C5 can call component C6 (associated with transaction element 510) to access a database1 and/or C7 (associated with transaction element 512) to access a database2, such as based on the type of the report request. For example, component C6 and component C7 can each include a JDBC driver call which invokes one or more SQL statements. The control flow may then return to component C5, then to component C2 and then to component C1. Subsequently, component C1 calls component C3, which relates to providing a display, such as a display of the requested report based on data retrieved from the databases. The control flow then returns to component C1.

Component C1 could call component C3 additional times such as to adjust the display, e.g., based on a user command to display (e.g., re-display) the report data differently (over a different time period, and so forth).

Also, under the root 500, a component C4 (associated with transaction element 514) can be provided which displays a quotes screen on a user interface (UI) to receive a user's input regarding a desired quote. Component C1 can call component C2 (associated with transaction element 504) which relates to a requested report. Component C2 can process the user input by checking the format of the request, for instance, and if the format is valid, obtaining the requested quote, such as from a data source which is local to subsystem1. If the format is invalid, the control flow returns to component C4, which may call component C3 to display an error message, for instance.

The control flow then returns to component C4. Component C4 can call component C3 (associated with transaction element 518), which relates to providing a display, such as a display of the requested quote based on the data retrieved from the data source. Component C4 could component call C3 additional times such as to adjust the display, e.g., based on a user command to display (e.g., re-display) the quote data differently (over a different time period, with different moving averages, and so forth).

Note that a component can continue executing after calling another component, which begins executing, in an asynchronous, multi-thread or multi-process mode. Or, a component can temporarily pause until the called component has finished executing, in a synchronous, single-thread or single-process mode. A component which is pausing can be considered to be in a wait interval, while a component which is executing can be considered to be in an active, executing mode. Also, a component may be invoked more than once during a transaction.

FIG. 5B depicts an alternative, more compact, view of the dependency relationships of FIG. 5A. Node 505 combines nodes 504 and 516, and node 507 combines nodes 506 and 518.

FIGS. 6A-6I depict transaction traces for different sequences of invoked components in the transactions of FIG.

5A. The horizontal direction represents time, while the vertical direction indicates call stack depth or position. A transaction trace, also referred to as a call stack, identifies instrumented components which have been called or invoked during the execution of one or more programs, processes or threads. Trace data of instrumented components can be used along with dependency data to understand and debug an application. A transaction trace can be a trace of all or a portion of a transaction and can extend over one or more computing devices having respective agents. In particular, a separate transaction trace can be provided for each agent, such that different threads are separated out into different transaction traces. The transaction trace can be provided by a graphical representation on a user interface display.

The transaction trace of FIG. 6A corresponds to blocks 502 and 504 of FIG. 5A. A graph portion 600 represents component C1, and a graph portion 602 represents component C2. Component C1 starts executing at t0 and ends or stops at t7. Component C2, which is called by component C1, starts executing at t1 and ends at t6.

The transaction trace of FIG. 6B is time-aligned with the transaction trace of FIG. 6A, and corresponds to blocks 508 and 510 of FIG. 5A. A graph portion 610 represents component C5, and a graph portion 612 represents component C2. Component C5 starts executing at t2 and ends at t5. Component C6, which is called by component C5, starts executing at t2 and ends at t4.

The transaction trace of FIG. 6C is time-aligned with the transaction trace of FIG. 6A, and corresponds to blocks 508 and 512 of FIG. 5A. A graph portion 620 represents component C5, and a graph portion 622 represents component C7. Component C5 starts executing at t2 and ends at t5. Component C7, which is called by component C5, starts executing at t2 and ends at t4. The transaction trace of FIG. 6C could be an alternative to the transaction trace of FIG. 6B if database2 was called instead of database1, for example. The time points t2-t5 are not necessarily the same as in FIG. 6B. Moreover, the time points t0, t1, t2, etc. generally do not necessarily represent equal time increments.

The transaction trace of FIG. 6D corresponds to blocks 502 and 504 of FIG. 5A. A graph portion 630 represents component C1, and a graph portion 632 represents component C2. Component C1 starts executing at t0 and ends at t3. Component C2, which is called by component C1, starts executing at t1 and ends at t2. This transaction trace could represent the case where component C1 calls component C2 and component C2 determines that the format of the user request is invalid, so that the control flow returns directly to component C1.

The transaction trace of FIG. 6E corresponds to blocks 502 and 506 of FIG. 5A. A graph portion 640 represents component C1, and a graph portion 642 represents component C3. Component C1 starts executing at t0 and ends at t3. Component C3, which is called by component C1, starts executing at t1 and ends at t2. This transaction trace could represent the case where component C1 calls component C3 and component C3 displays or re-displays a report.

The transaction trace of FIG. 6F corresponds to blocks 502 and 506 of FIG. 5A. A graph portion 650 represents component C1, and graph portions 652 and 654 represent separate invocations of component C3. Component C1 starts executing at t0 and ends at t5. Component C3, when called by component C1 a first time, starts executing at t1 and ends at t2. Component C3, when called by component C1 a second time, starts executing at t3 and ends at t4. This transaction trace could represent the case where component C1 calls component C3 a first time to display a report, and a second time to re-display a report.

The transaction trace of FIG. 6G corresponds to blocks 502, 504 and 506 of FIG. 5A. A graph portion 660 represents component C1, a graph portion 662 represent component C3, and a graph portion 664 represents component C2. Component C1 starts executing at t0 and ends at t5. Component C3, when called by component C1, starts executing at t1 and ends at t2. Component C2, when called by component C1, starts executing at t3 and ends at t4. This transaction trace could represent the case where component C1 calls component C3 to display a report, and the user make another request for a report, but the request is in an invalid format so that the control flow returns directly from component C2 to component C1.

The transaction trace of FIG. 6H corresponds to blocks 514 and 516 of FIG. 5A. A graph portion 670 represents component C4, and a graph portion 672 represents component C2. Component C4 starts executing at t0 and ends at t3. Component C2, which is called by component C1, starts executing at t1 and ends at t2. This transaction trace could represent the case where component C4 calls component C2 with a user request for a quote.

The transaction trace of FIG. 6I corresponds to blocks 514 and 518 of FIG. 5A. A graph portion 680 represents component C4, and a graph portion 682 represents component C3. Component C4 starts executing at t0 and ends at t3. Component C3, which is called by component C1, starts executing at t1 and ends at t2. This transaction trace could represent the case where component C4 calls component C3 and component C3 displays a quote.

FIG. 7A1 depicts an example of tree data structures 701 of agent1 and agent2 which are provided based on the transaction traces of FIGS. 6A-6I. A tree data structure 701 can be represented by a directed graph or distributed tree which includes nodes and arrows or edges connecting the nodes. Each different path through the tree can be considered to represent a branch of the tree. Each respective branch represents a respective transaction of at least one application. In one embodiment, each node is associated with the start or end of the execution of a component. Each node can also include a unique identifier. The identifier of a last node in a branch can serve as a unique identifier of the branch (e.g., unique within a subsystem/agent). A branch of the tree can represent a component sequence for a transaction which extends across multiple subsystems as well. For example, the portion of the dotted line includes nodes associated with components which execute in subsystem1, and the portion below the dotted line includes nodes associated with components which execute in subsystem2. A branch can overlap with another, such that they have some nodes in common. For example, agt1-branch1 and agt1-branch2 have node 702 in common. Typically, at least the root node is common to multiple branches.

Each agent that monitors an application or other software maintains a tree data structure, in one embodiment. For example, an agent1 (agt1) at a subsystem1 can maintain the tree data structure which begins at root node 700, and an agent2 (agt2) at a subsystem2 can maintain the tree data structure which begins at root node 742. A manager can maintain a tree data structure which is based on the tree data structure of one or more agents. For example, a manager can maintain the tree data structure of FIG. 14A, which combines the tree data structures of agent1 and agent2.

A root node 700 is a starting node for all branches in subsystem1. A first branch (agt1-branch1, representing a transaction agt1-T1) includes nodes 702, 704, 706 and 708. A second branch (agt1-branch2, representing a transaction agt1-T2) includes nodes 702, 710, 712 and 714. A third branch (agt1-branch3, representing a transaction agt1-T3) includes nodes 702, 710, 712, 716, 718 and 720. A fourth branch (agt1-branch4, representing a transaction agt1-T4) includes nodes 702, 710, 712, 722, 724 and 726. A fifth branch (agt1-branch5, representing a transaction agt1-T5) includes nodes 728, 730, 732 and 734. A sixth branch (agt1-branch6, representing a transaction agt1-T6) includes nodes 728, 736, 738 and 740.

A root node 742 is a starting node for all branches in subsystem2. A first branch (agt2-branch1, representing a transaction agt2-T1) includes nodes 744, 746, 748 and 750. A second branch (agt2-branch2, representing a transaction agt2-T2) includes nodes 744, 752, 754 and 756.

An identifier of each node can indicate a sequential position of the node within a branch, e.g., based on a number of values in the identifier. For example, node 702 has the identifier "0:0." This identifier has two values, separate by a colon, indicating that it is the second node in the branch, after the root node (having the identifier "0"). In the second, third and fourth branches, nodes 702, 710 and 712 (the second, third and fourth nodes) are common. In the second branch, the last node 714 has the identifier 0:0:1:0:0. In the third branch, the last node 716 has the identifier 0:0:1:0:1. In the fourth branch, the last node 722 has the identifier 0:0:1:0:2. Various other node identification schemes/code words could be used as well.

Note that each node in the tree data structure may be associated with a key, such as was discussed with respect to FIGS. 5A and 5B. As stated above, a key may be used to identify a transaction element. For example, the key K1 may be associated with node 702 and the key K4 may be associated with node 728. The keys are not shown in FIG. 7A1 so as to not obscure the diagram. In some cases, the agent is unable to determine the key while the transaction is executing. In the present example, if the agent cannot determine whether the first key is K1 or K4, then the agent is not able to determine whether the first node is 702 or 728. As is discussed below, the agent constructs a provisional branch in such cases such that transaction data may be efficiently traced and reported.

The node identifiers can be assigned independently, and therefore potentially repeated, in the different subsystems. However, the combination of a subsystem identifier (e.g., agent identifier) and a node identifier will be unique.

The tree data structure can be provided in different ways. In one approach, an agent of the subsystem builds the tree data structure over time as additional transactions are traced. Each transaction trace, e.g., sequence of transaction elements, is compared to the branches of the tree to determine if there is a match. If there is a match, the transaction is already represented by the tree. However, if there is no match, the transaction is not already represented by the tree, and the tree data structure can be updated to represent the new transaction. The updating can involve adding a new branch which may or may not overlap, in part, with an existing branch. The new branch is provided by adding additional nodes which may be associated with the start and end of invoked components of the new transaction.

Each agent at a server and a manager can maintain separate tree data structures which correspond to one another. Ideally, the tree data structures are synchronized, at least in part, so that they represent the same set of transactions of at least one application or other software. As mentioned, when the agent detects a new transaction, it can update its tree data structure and report the update to the manager. The manager, in turn, can update its tree data structure. Moreover, there may be other agents which monitor other instances of the at least one application, and it is desirable for them to receive the updates as well to update their respective tree data structures. In one approach, the agent which detects a new transaction can provide the update directly to the other agents. In another approach, the agent reports the update to the manager, and the manager relays the updates to the other agents. This approach is efficient since the manager knows which other agents are reporting to the manager and can communicate the updates to them. The updates can be provided in any format. Updates sent from an agent to a manager may be communicated with dynamic data or separately.

By having the agent and manager maintain corresponding tree data structures, efficiency can be increased. For example, static data which is associated with a transaction, and with components of the transaction, can be indexed to nodes of the tree and thereby made available to the manager by merely identifying a branch in the tree. The static data need not be repeatedly communicated by the agent to the manager. Static data generally does not change for a given version of the application or other monitored software. Thus, the same static data can be associated with multiple invocations of a given transaction or component. In contrast, dynamic data such as the start and end times of components, and other dynamic data such as a value of a parameter passed to a method, are not fixed, and can change for each traced transaction and for each invocation of a given component. Dynamic data as gathered by the agent can be reported from the agent to the manager. However, efficiencies can still be achieved by indexing the dynamic data to the nodes to readily identify the invoked components to which the dynamic data applies. Various data structures which can be used to achieve these efficiencies are described in connection with FIGS. 15A1-15C.

FIG. 7A2 depicts an alternative and equivalent view of the tree data structure 701 of FIG. 7A1. Here, nodes 711 and 717 are the same as node 710, and nodes 713 and 719 are the same as node 712 having the same respective node identifiers. In this view, agt1-branch2 includes nodes 710, 712 and 714, agt1-branch3 includes nodes 711, 713, 715, 718 and 720 and agt1-branch4 includes nodes 717, 719, 721, 724 and 726. This view clarifies that node 714 is not part of agt1-branch3 and agt1-branch4.

Figure 9A:
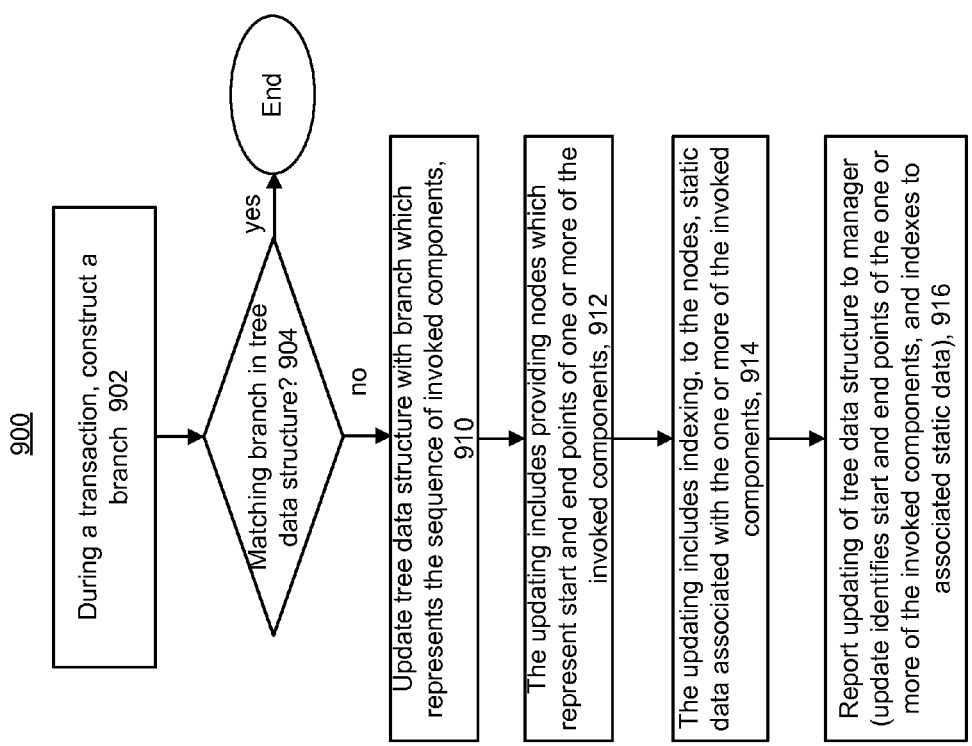
FIG. 9A depicts an example process of maintaining a tree data structure such as in FIG. 7A1 for at least one application.

FIG. 8A is a flowchart illustrating a process 800 of reporting transaction data using a tree data structure when a transaction cannot be identified by the agent while tracing the transaction. An agent may perform steps of process 800. However, some steps such as maintaining the tree data structure may be performed by both the agent and manager. Process 800 may use a tree data structure such as the examples depicted in FIGS. 7A1 and 7A2. In step 802, a tree data structure is maintained. The tree data structure may be maintained by an agent in storage used by the agent to store performance metrics. An agent could maintain a single tree data structure for all transactions that it traces, although this is not a requirement. The manager and other agents may help to maintain the tree data structure. FIG. 9A provides more details for maintaining a tree data structure.

In step 804, tracing of an instance of a transaction is started. FIGS. 2A and 2B described general flows associated with tracing a transaction. In general, tracing may begin when a probe that was inserting into the application being monitored is executed. For example, when a software component associated with the transaction is invoked a probe that was inserted into the software component may execute. At this point, a determination may be made whether the transaction element that is associated with this point in the transaction can be identified. In one embodiment, identifying the transaction element includes matching information collected by agent to rules that define transaction elements. It may be that the agent is unable to access the needed information at this time. One example in which it might not be possible to identify the transaction element is if its identification depends on POST parameters. Another example is if its identification depends on a response, such as whether the response is error, success, etc.

In process 800, it is assumed that the agent is unable to access information to identify a transaction element while tracing the transaction. As noted above, by information not being accessible to the agent it is meant that either the information is not safely accessible or is completely inaccessible. An example in which the information is not safely accessible is when the transaction identity depends on HTTP POST parameters that cannot be safely accessed by the agent, at least initially. An example in which the information is completely inaccessible, at least initially, is when the transaction identity depends on a reply that is sent after completion of at least a portion of the transaction.

Thus, the agent constructs a provisional branch for this instance of the transaction. A provisional branch may be similar to a branch depicted in FIG. 7A1 or 7A2. However, there will be at least one node for which the agent cannot determine the key while tracing the transaction. Recall that there is a key associated with each node in FIG. 7A1. For example, key K1 may be associated with node 702 and K4 may be associated with node 728.

In one embodiment, the provisional branch has a virtual node that serves as a placeholder for an actual node. A virtual node is one that is not actually in the tree data structure being maintained. Moreover, it is one for which the key cannot be identified at the time of tracing. Thus, the virtual node may have a virtual key in place of the actual key. FIG. 8B represent a provisional branch 850 that the agent constructs. Node 852 is a virtual node having a virtual key V1.

The agent may well be able to identify other keys as the transaction progresses. For example, the agent may determine that when a certain Servlet is invoked that this corresponds to a second transaction element. This is reflected in the provisional branch by node 854. Node 854 may be referred to herein as an actual node because the key was identified. Nodes 856 and 858 represent end nodes associated with nodes 854 and 852, respectively.

In step 808, the agent stores transaction data for the provisional branch. This may be dynamic transaction data, e.g., metrics, for the sequence of invoked components, including start and end times of the invoked components. This dynamic data can be obtained from the transaction trace. The agent may store the data in association with a specific node in the provisional branch 850. The transaction data for the virtual node may be the same data that would be stored if the transaction element was uniquely identified. Note that storing this transaction data even though the identity of the transaction element is not known may allow for efficient tracing of the transaction. A reason for this is that the tree data structure being constructed provides for an efficient way to collect tracing information.

At some point, the agent will have access to the information needed to identify the transaction element. This may be when the transaction ends. However, the agent may have access to this information earlier. Even if the agent could access the information earlier, the agent is not required to do so. In step 810, the agent identifies the transaction element that could not be identified earlier. For example, POST parameters are accessed to identify the transaction element.

In step 812, branch in the tree data structure that matches the provisional branch is identified, if possible. The agent may determine that the virtual key V1 can be replaced by the key K1. Therefore, the agent may match the updated provisional branch to agent1-branch1 in FIG. 7A1, as one example. In some cases, there might not be a matching branch, in which case a new branch can be added to the tree data structure.

In step 814, transaction data associated with the provisional branch is stored in association with the tree data structure. In one embodiment, the transaction is replayed against the matching branch. For example, the provisional branch is walked down from the root to the leaf node, as if it was happening again. Each time a new node is encountered, its transaction data is transferred to the common storage area. Further details are discussed below.

In step 816, the transaction data that was stored in association with the tree data structure is reported to the manager 111. Step 816 may include reporting the dynamic data and an identifier of the matching branch (e.g., agt1-branch1, or node 0:0:0:0:0) to the manager. The dynamic data could be reported as a list of start and stop times of the invoked components, for instance, where each time corresponds to one of the nodes of the branch, and the order of the reported times corresponds to the order of nodes in the branch. The time can be a time stamp, for instance, based on a clock of the agent.

FIG. 9A depicts an example process 900 of maintaining a tree data structure such as in FIG. 7A1 for at least one application. The process is one embodiment of step 802 from FIG. 8A. Process 900 includes maintaining a tree data structure with branches which represent transactions. For example, each branch may correspond to a different type of transaction (e.g., buy, sell, report, etc.). Each transaction has one or more transaction elements. The transaction elements may be associated with software components that are invoked as a part of processing the transaction. Step 902 includes constructing a branch during an instance of transaction. Step 902 may include identifying transaction elements. In one embodiment, an agent identifies keys to identify the transaction element. In some cases, the key can be identified by the agent while the transaction executes. Thus, the agent may initially construct a provisional branch. However, by the end of step 902 the agent should be able to identify all transaction elements. Thus, any virtual nodes should be replaced with actual nodes. Step 902 may include identifying a sequence of invoked components. For example, this can include tracing the transaction.

At decision step 904, a determination is made whether there is a matching branch in the tree data structure. For example, assume a transaction trace results in the following sequence of transaction element keys: start K1, start K2, end K2, end K1. (Note that this sequence may be associated with invoked components: start C1, start C2, end C2, end C1). This sequence of keys can be compared in turn to each branch in the tree data structure of FIG. 7A1, for instance, until a matching branch is found. In one approach, the comparison proceeds one branch at a time, starting at a first branch. In another approach, branches which have a number of nodes which corresponds to the number of start and end points of the transaction trace are first compared. Other approaches are possible as well. In this example, agt1-branch1 is a matching branch.

A matching branch can be a branch which has the same number of nodes as the number of start and end points of the sequence of invoked components of the transaction, where the sequence of nodes in the branch matches the start and end points of the sequence of invoked components of the transaction. The root node of the tree need not be considered in the matching.

In some cases, a branch can have a sequence of nodes which match the start and end points of the sequence of invoked components of the transaction, but have additional nodes as well. In this case, there is a partial match for the start and end points of the sequence of invoked components of the transaction, and decision step 904 is false.

Figure 9B:
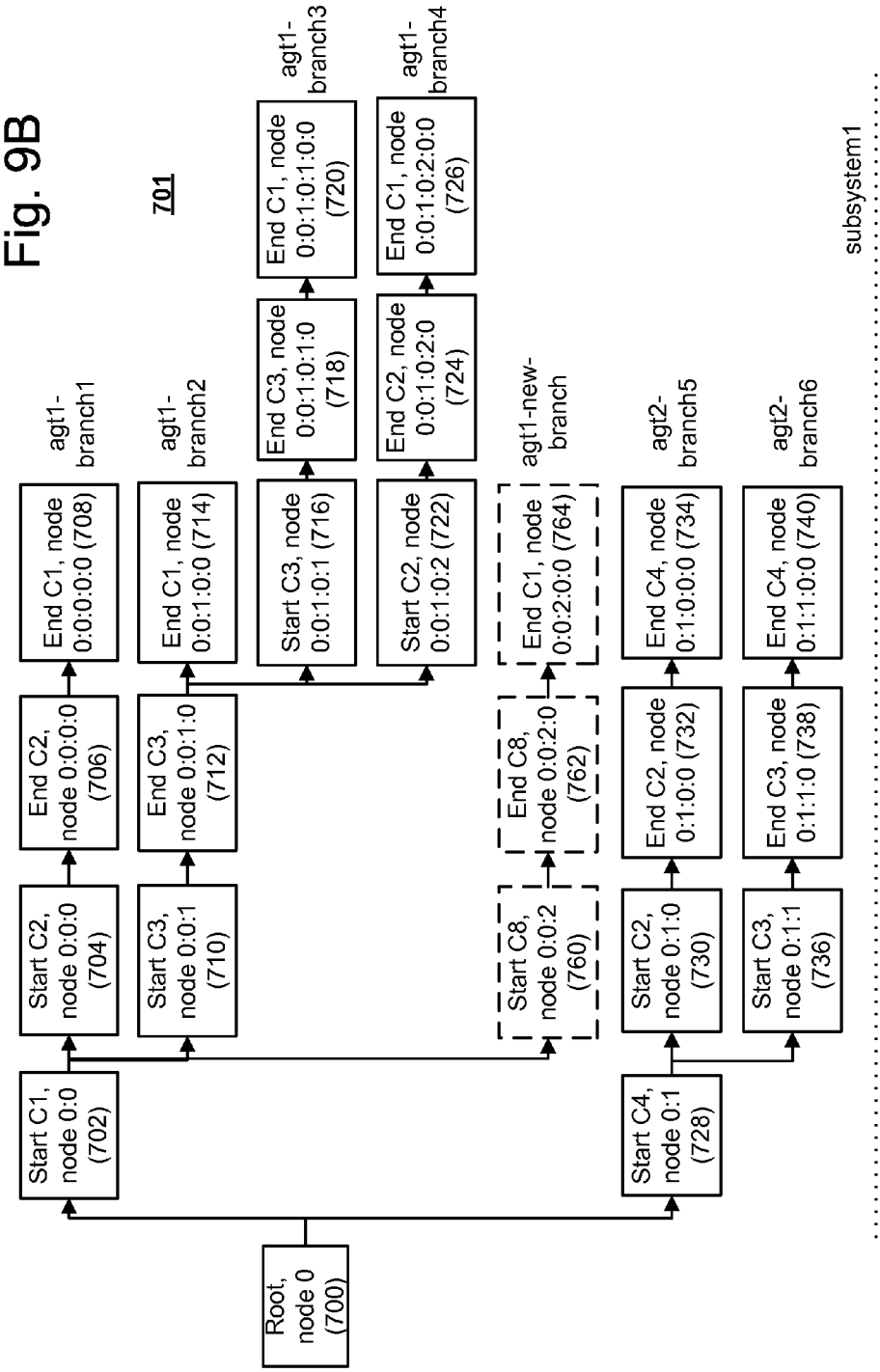
FIG. 9B depicts an update to the tree data structure of agent1 of FIG. 7A1 in the form of a new branch.

In this case, the transaction trace provides a new sequence of start and end points of a sequence of invoked components which is not exactly represented by, and co-extensive with, a branch of the tree data structure. In response to determining this, step 910 includes updating the tree data structure with a branch which represents, and is co-extensive with, the sequence of invoked components. For example, this can be agt1-new-branch in FIG. 9B. FIG. 9B depicts an update to the tree data structure 701 of agent1 of FIG. 7A1 in the form of a new branch. For clarity, subsystem2 is not depicted. Agt1-new-branch, representing a transaction agt1-Tnew, is a new branch which is added to update the tree data structure of agent1, as discussed further below in connection with the process of FIG. 9A. Agt1-new-branch includes pre-existing node 702 (start C1) having an identifier "0:0", node 760 (start C8) having an identifier "0:0:2", node 762 (end C8) having an identifier "0:0:2:0" and node 764 (end C1) having an identifier "0:0:2:0:0". This is a pathway which is newly-detected by agent1. A co-extensive branch has the same start and end points as the sequence.

At step 912, the updating can include providing nodes which represent start and end points of one or more invoked components in the transaction trace, in a new branch. For example, in FIG. 9B, agt1-new-branch includes the newly added nodes 760, 762 and 764. The new branch can overlap in part with one or more existing branches. For example, in FIG. 9B, node 702 is present (overlapping) in agt1-branch1, agt1-branch2 and agt1-new-branch, so that agt1-new-branch overlaps with agt1-branch1 and agt1-branch2.

Thus, the sequence of invoked components of the new transaction is represented in the tree data structure by a branch (e.g., agt1-new-branch) having an overlapping portion (node 702) which overlaps with at least one of the pre-existing branches (e.g., agt1-branch1 and agt1-branch2) and a non-overlapping portion (a branch portion including nodes 760, 762 and 764) which does not overlap with any of the pre-existing branches. The new nodes (nodes 760, 762 and 764) are provided in the non-overlapping portion but not in the overlapping portion.

In FIG. 9A, step 914 indicates that the updating of the tree data structure includes indexing, to the nodes, static data associated with the one or more of the invoked components. The static data of a component can be accessed by the agent from instrumentation of the component, and indexed as discussed in connection with FIG. 15B3.

Step 916 includes reporting the update of the tree data structure from the agent to the manager. The update can identify start and end points of the one or more of the invoked components of the subject transaction instance, and indexes to associated static data. This report can be provided in the form of a branch definition as set forth in FIG. 15A1 or 15A2, and the references to static data as set forth in FIG. 15B1 or 15B2. Upon receipt of this report, the manager can update its tree data structure so that it is synchronized with the agent's tree data structure. Thus, the agent can efficiently report the transaction to the manager while reducing overhead costs such as the amount of bandwidth needed to send data over a communication path and/or the amount of memory needed to communicate and store such data.

Figures 10A, 10B:
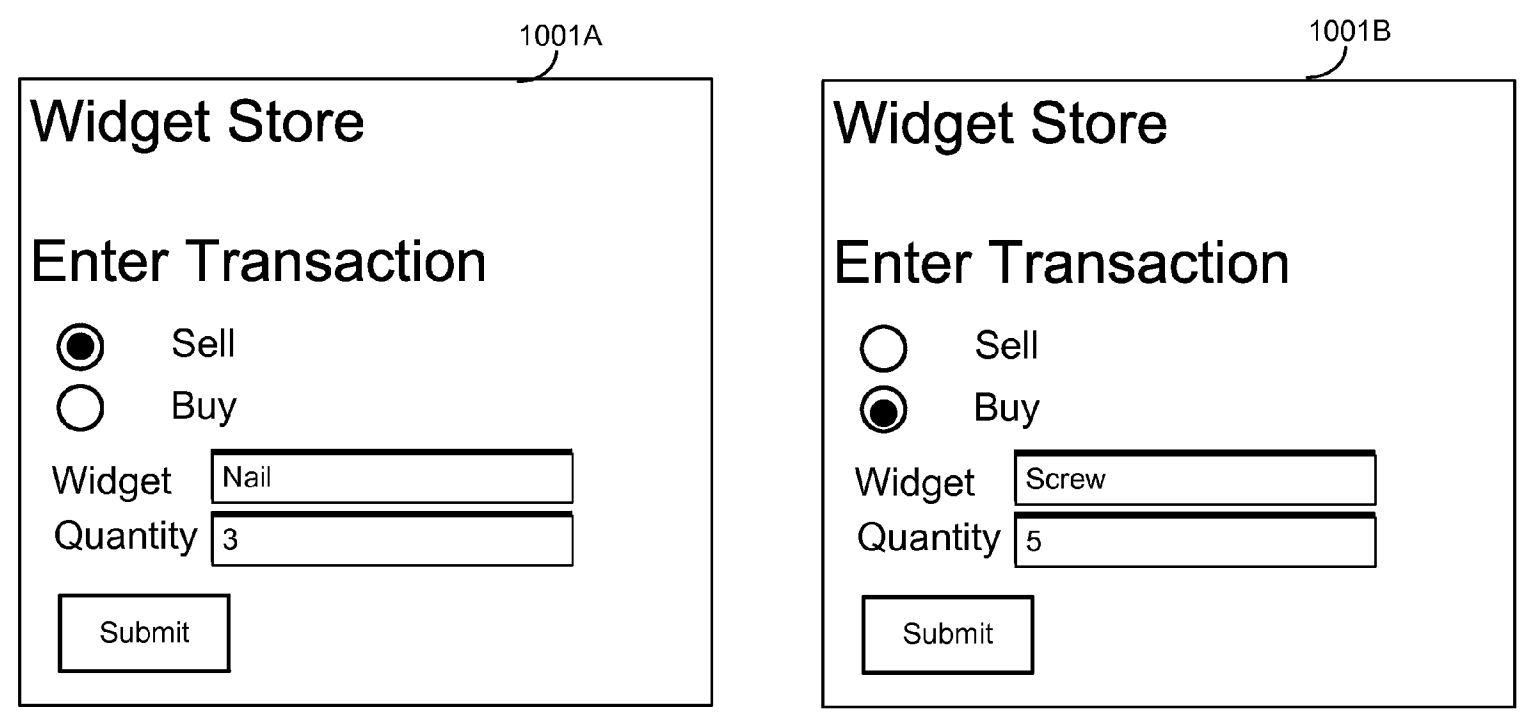

The following provides a more detailed example of a transaction element that cannot be identified by the agent, at least while initially tracing the transaction. This example is for monitoring a small widget store web application. FIGS. 10A and 10B each show example web pages 1001a, 1001b for ordering widgets. In FIG. 10A, the user is entering a sell transaction. In FIG. 10B, the user is entering a buy transaction. The sell transaction is one example of a transaction that may have a branch in a data tree structure. Likewise, the buy transaction could have a different branch in the data tree structure. For the sake of illustration, the buy transaction might correspond to agt1-branch1 in FIG. 7A1. For the sake of illustration, the sell transaction might correspond to agt1-branch5 in FIG. 7A1. As the following will illustrate, it may be difficult for the agent to distinguish between the sell transaction and the buy transaction, at least initially.

Table 1 shows example code for the widget store order page of FIGS. 10A and 10B.

TABLE 1

```
<html>
<head>
<title>A Widget Store</title>
</head>
<body>
<h1>Enter Transaction:</h1>
<form name="input" action="/WidgetStore/run" method="post">
    <input type="radio" name="transaction" value="Sell" /> Sell<br>
    <input type="radio" name="transaction" value="Buy" /> Buy<br>
    Widget: <input type="text" name="widget" /><br>
    Quantity: <input type="text" name="quantity" /><br>
    <input type="submit" value="Submit" />
</form>
</body>
</html>
```

When hits the submit button for the "Sell transaction" of FIG. 10A, the request depicted in Table 2 may be sent to an application servlet being monitored.

TABLE 2

POST /WidgetStore/run HTTP/1.1
Host: talma06-t7400:8383
User-Agent: Mozilla/5.0 (X11; U; Linux x86_64; en-US; rv:1.9.0.18)
Gecko/2010020406 Red Hat/3.0.18-1.el5_4 Firefox/3.0.18
Accept: text/html,application/xhtml+xml,application/xml;q=0.9,*/*;q=0.8
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
Referer: http://talma06-t7400:8383/WidgeStore/order.html
Content-Type: application/x-www-form-urlencoded
Content-Length: 38
transaction=Sell&widget=Nail&quantity=3

The request of Table 2 contains POST parameters in the last line (transaction=Sell&widget=Nail&quantity=3). The POST parameters indicate that it is a sell transaction. However, note that the agent may be unable to access the POST parameters while the transaction is being traced. For example, if the agent was to attempt to access the POST parameters it could possible corrupt the data stream. Therefore, the agent may wait until the transaction is over before accessing the POST parameters.

The request in Table 3 shows what may be sent to a servlet in response to the user hitting the submit button for the buy transaction of FIG. 10B.

TABLE 3

POST /WidgetStore/run HTTP/1.1
Host: talma06-t7400:8383
User-Agent: Mozilla/5.0 (X11; U; Linux x86_64; en-US; rv:1.9.0.18)
Gecko/2010020406 Red Hat/3.0.18-1.el5_4 Firefox/3.0.18
Accept: text/html,application/xhtml+xml,application/xml;q=0.9,*/*;q=0.8
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
Referer: http://talma06-t7400:8383/WidgeStore/order.html
Content-Type: application/x-www-form-urlencoded
Content-Length: 37
transaction=Buy&widget=Screw&quantity=5

Again, the request of Table 3 contains POST parameters in the last line (transaction=Buy&widget=Screw&quantity=5). The POST parameters indicate that it is a buy transaction. Note that in this example other parts of the request may be accessible to the agent. However, in this case the other parts of the sell and buy request do not contain any information that may be used to distinguish between the two transactions.

Figure 11:
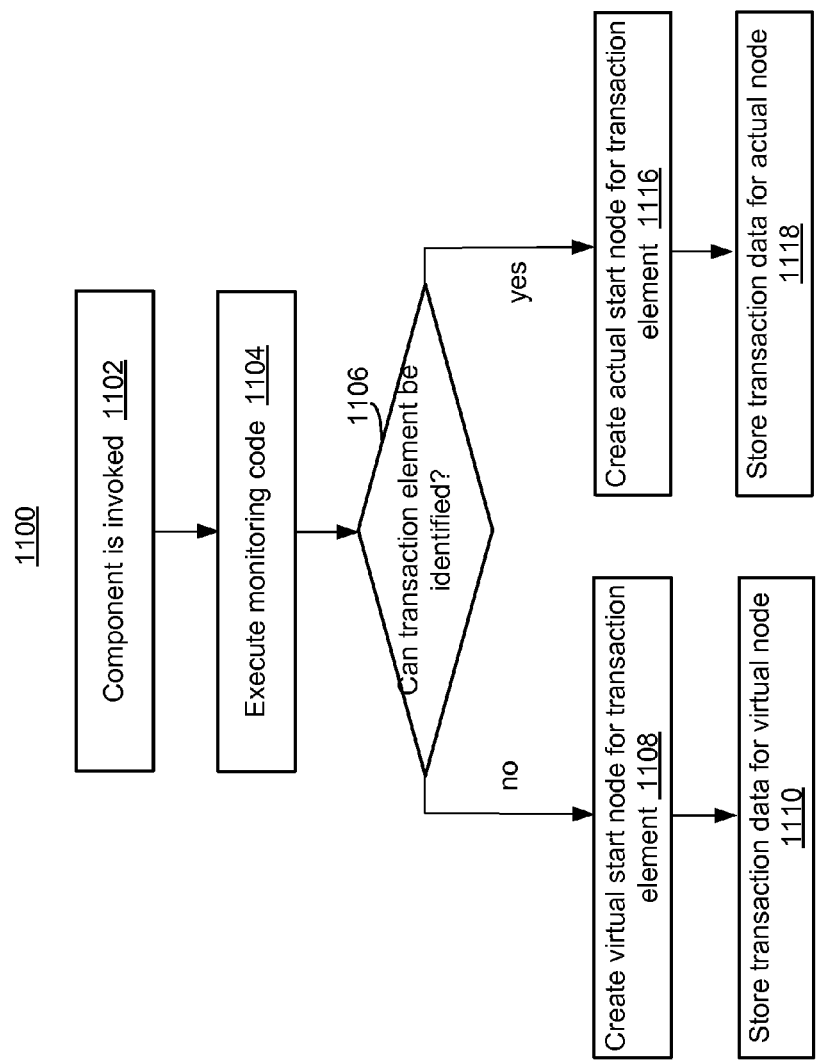
FIG. 11 is a flowchart of one embodiment of a process of constructing a node for a provisional branch and storing transaction data in association with the nodes.

FIG. 11 is a flowchart of one embodiment of a process 1100 of constructing a node for a provisional branch and storing transaction data in association with the node. This process 1100 may be used each time that a component associated with a transaction is invoked. The process 1100 may be used one or more times to implement step 806 of process 800. Process 1100 will be discussed using an example in which the transaction corresponds to agt1-branch1 and agent1-branch5 in FIG. 7A1. One branch may be for a buy transaction, and the other for a sell transaction. In this example, the agent is unable to determine whether the first node is node 702 or 728 at the start of tracing the transaction.

In step 1102, a component that is associated with a transaction is invoked. As one possibility, the component is one that receives the request that resulted after the user hit the submit button in either FIG. 10A or 10B.

In step 1104, monitoring code that is associated with a transaction point is executed. For example, when a software component associated with the transaction is invoked a probe that was inserted into the software component may execute. The probe may be considered to be part of the agent. At this point, an attempt may be made to identify the transaction element that is associated with this point in the transaction. In one embodiment, identifying the transaction element includes matching information accessed by the agent to rules that define transaction elements. It may be that the agent is unable to access the needed information at this time. One example in which it might not be possible to identify the transaction element is if its identification depends on POST parameters. Another example is if its identification depends on a response, such as whether the response is error, success, etc.

If the transaction element cannot be identified at this time (step 1106=no), then a virtual node is created for the transaction element, in step 1108. In one embodiment, the virtual node is associated with one of the software components in the application being monitored. This could be the component that invoked in step 1102, but that is not a requirement.

In step 1108, transaction data is stored in association with the virtual node. The transaction data may be the same data that would be stored if the transaction element was uniquely identified. Note that storing this transaction data even though the identity of the transaction element is not known may allow for efficient tracing of the transaction. A reason for this is that the tree data structure being constructed provides for an efficient way to collect tracing information.

In this example, there is another component in the transaction. Thus, process 1100 may be repeated when the next component is invoked. Also, for the sake of discussion, the agent is able to identify the transaction element in this case. The key may be K2. This key may be that a certain Servlet was invoked. In this example, the agent is able to determine that this Servlet was invoked. Therefore, the agent creates an actual node with the key K2, in step 1116. This agent associates this actual node with component C2, which may be the Servlet that was invoked. In step 1118, transaction data is stored in association with the actual node.

There may be a similar process when the various components in a transaction complete. In some cases, the agent records a time value when the component completes so that the amount of time spent executing the component is known. In some cases, a virtual end node may be created to go along with the virtual start node. However, if the transaction element can be identified when the component has ended, then the agent may create an actual end node. The agent may also update the virtual node based on the identified transaction element.

FIG. 12 is a flowchart of one embodiment of a process 1200 of attempting to identify a transaction element. Process 1200 is one embodiment of step 1106 of FIG. 11. In step 1202, the agent determines the information that it needs to identify a transaction element. This may include accessing a set of rules that define how transactions elements are identified. As one example, the agent may determine that it needs to know a URL in a request. As another example, the agent may determine that it needs to know the POST parameters in an HTTP request. As still another example, the agent may determine that identifying the transaction element comprises accessing an element of a reply associated with the transaction.

In step 1204, the agent determines whether the information may be accessed by the agent at this time. If so, the information is accessed in step 1206.

Then, the information may be matched to a set of rules to identify the transaction element. For example, the agent may match a URL that was accessed in step 1206 to uniquely identify a transaction element. After step 1208, processing could continue at step 1116 of FIG. 11, in which case a virtual node is created.

On the other hand, if the agent determined that the information is not accessible to the monitored code at this time, then this process ends without identifying the transaction element. In this event processing might continue at step 1108 of FIG. 11, in which case a virtual node is created.

Note that the process 1200 of FIG. 12 may also be used to identify a transaction element that the agent was not able to identify earlier. In this case, the agent may perform the process 1200 at the end of tracing the transaction, as one example. For example, after tracing a transaction for which POST parameters were needed to identify a transaction element, the agent may perform process 1200. As another example, after tracing a transaction for which a code in a response was needed to identify a transaction element, the agent may perform process 1200. For example, the code in the response could be whether the transaction ended with an error, successfully completion, etc. Thus, process 1200 may be used to implement step 810 of process 800.

Figure 13A:
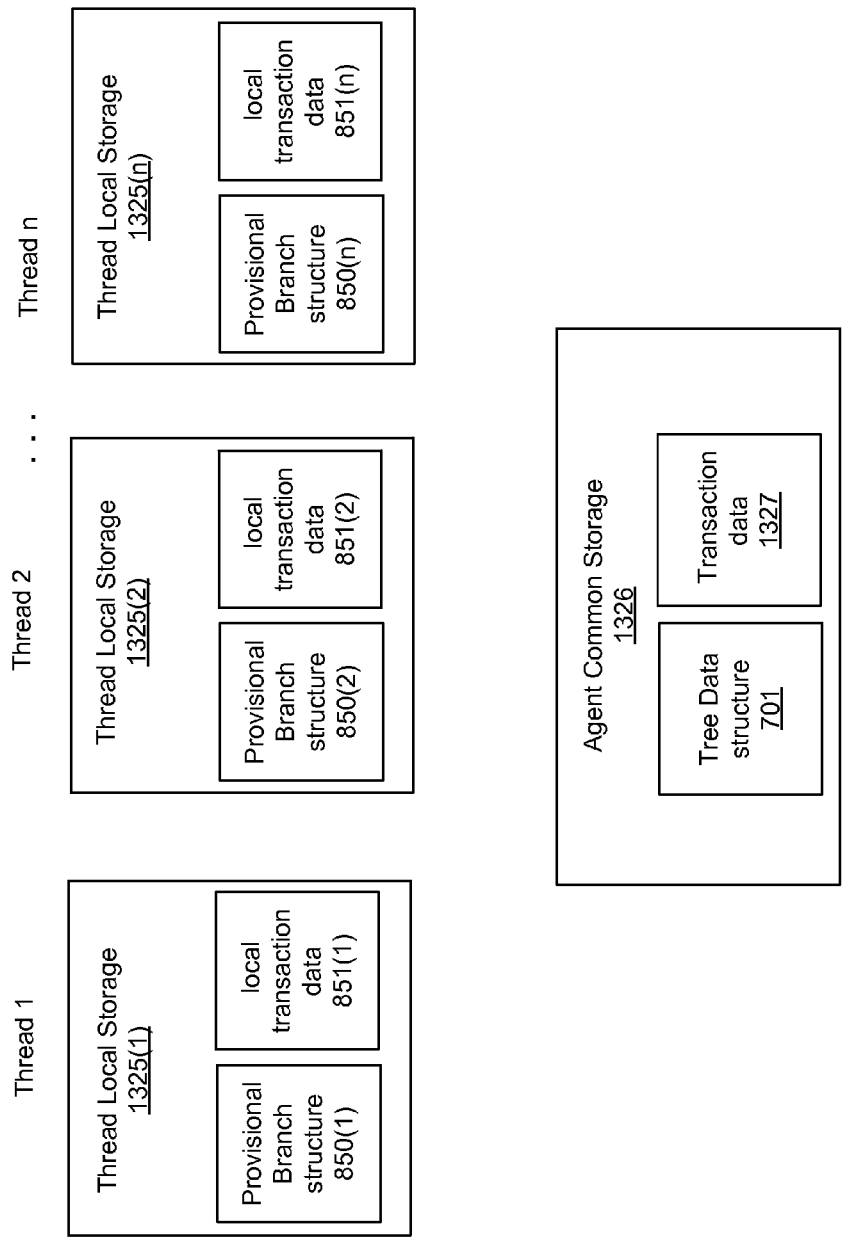
FIG. 13A shows a diagram of several instances of thread local storage.

In one embodiment, the virtual branch and associated transaction data is stored in memory that is local to a thread, process, etc. that processes the transaction. For example, the virtual branch and associated transaction data may be stored in thread local storage. FIG. 13A shows a diagram several instances of thread local storage 1325(1)-1325(n) for various threads, each of which is executing a different instance of some transaction. Each thread local storage 1325 corresponds to one instance of transaction that is currently executing. The virtual branch 850(1)-850(n) and associated local transaction data 851(1)-851(n) is stored in this thread local storage 1325(1)-1325(n), in one embodiment. Therefore, while the transaction is executing, the data associated with the transaction trace may be isolated from other transaction data. On the other hand, the tree data structure 701 is not required to be stored in thread local cache. Therefore, after the transaction completes, the local transaction data 851 is transferred to this common storage 1326, where it may be merged with transaction data 1327 from other transactions. In one embodiment, it is the transaction data 1327 associated with the tree data structure 701 that is reported to the manager.

FIG. 13B is a flowchart of one embodiment of a process 1300 of transferring transaction data from thread local storage to agent common storage. This may be referred to as replaying a transaction. Process 1300 is one embodiment of step 814 of FIG. 8. Prior to process 1300, the agent has determined which branch in the data tree structure 701 matches the provisional branch 850 (e.g., step 812, FIG. 8). In general, process 1300 processes each node in the provisional branch, such as a provisional branch 850 constructed in step 806 of FIG. 8.

In step 1302, transaction data for the first node in the provisional branch 850 is accessed. In one embodiment, the transaction data is accessed from thread local storage 1325. In one embodiment, the transaction data is accessed from storage that is owned by a thread or process that executes the transaction.

In step 1304, the transaction data is transferred from the thread local storage 1325 to agent common storage 1326 that contains transaction data for other transactions being monitored by the agent. The agent common storage 1326 has a tree data structure 701 in one embodiment. Step 1304 may include associating the transaction data with a node in the tree data structure 701 that corresponds to the node in the provisional branch 850.

If there are mode nodes in the provisional branch (step 1306=yes), then the process returns to step 1302 to process the next node. In this manner, each node in the provisional branch 850 may be processed. Note that there will not necessarily be dynamic transaction data associated with each node in the provisional branch 850. For example, the provisional branch 850 could have a start node and an end node for the same software component. In this case, the transaction data might not need to be stored for both the start node and end node.

After process 1300 concludes, the transaction data in the agent common storage 1326 is free to be reported to the manager, along with dynamic transaction data for other instances of the same transaction, and with transaction data for other transactions. The agent might combine the transaction data for this instance of the transaction with transaction data for other instances of this transaction to report the transaction data more efficiently. For example, rather than reporting the execution time of each instance of the transaction, the agent might report the average execution time for all instances of the transaction.

Figure 14A:
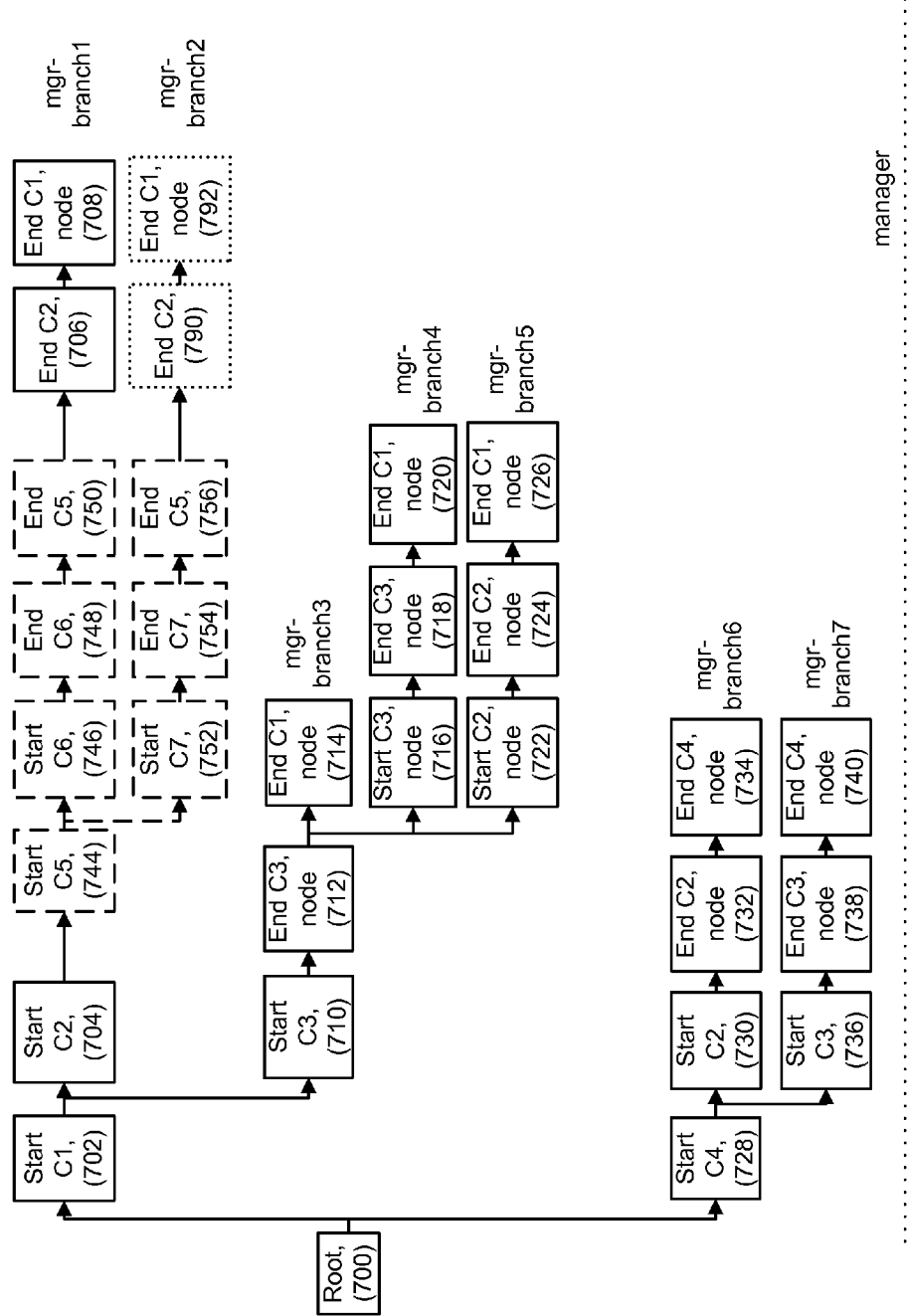
FIG. 14A depicts a tree data structure of a manager which combines the tree data structures of agent1 and agent2 of FIG. 7A1.

In one embodiment, the manager combines the tree data structures from various agents. FIG. 14A depicts a tree data structure 701 of a manager which combines the tree data structures of agent1 and agent2 of FIG. 7A1. As mentioned, the tree data structure of the manager can combine tree data structures of different agents to provide a data structure which spans multiple agents and applications or other software. In this case, a first portion of the manager's tree data structure corresponds to a first agent's tree data structure and a second portion of the manager's tree data structure corresponds to a second agent's tree data structure. The dashed line nodes (nodes 744, 746, 748, 750, 752, 754 and 756) correspond to nodes from the agent2 tree data structure, and the dotted line nodes (nodes 790 and 792) are added based on the dashed line nodes. The solid line node of the manager's tree data structure corresponds to the agent1 tree data structure. Since it is known that C2 calls C5, node 704 points to node 744. Since it is known that C5 returns to C2, node 750 points to node 706 for the case where the sequence of nodes 744, 746, 748 and 750 is followed, and additional nodes 790 and 792 are added where node 756 points to node 790 for the case where the sequence of nodes 744, 752, 754 and 756 is followed. Nodes 790 and 792 are the same as nodes 706 and 708, respectively, from the point of view of agent1.

Thus, the manager's (mgr) tree data structure includes these branches: mgr-branch1, mgr-branch2, mgr-branch3 (same as agt1-branch2), mgr-branch4 (same as agt1-branch3), mgr-branch5 (same as agt1-branch4), mgr-branch6 (same as agt1-branch5) and mgr-branch7 (same as agt1-branch6). Mgr-branch1 represents a sequence of invoked components in a cross-subsystem transaction because the transaction involves multiple subsystems. Mgr-branch1 represents a transaction mgr-T1 which combines multiple transactions, e.g., part of transaction agt1-T1 (nodes 702 and 704), followed by transaction agt2-T1 (nodes 744, 746, 748 and 750), followed by a remainder of transaction agt1-T1 (nodes 706 and 708). Recall that transaction agt1-T1 is from subsystem1 and agt2-T1 is from subsystem2. Mgr-branch2 represents a transaction mgr-T2 which combines part of transaction agt1-T1 (nodes 702 and 704), followed by transaction agt2-T1 (nodes 744, 752, 754 and 756), followed by a remainder of transaction agt1-T1 (nodes 790 and 792). Mgr-branch3 represents a transaction mgr-T3 which is the same as transaction agt1-T2 (nodes 702, 710, 712 and 714). Mgr-branch4 represents a transaction mgr-T4 which is the same as transaction agt1-T3 (nodes 702, 710, 712, 716, 718 and 720). Mgr-branch5 represents a transaction mgr-T5 which is the same as transaction agt1-T4 (nodes 702, 710, 712, 722, 724 and 726). Mgr-branch6 represents a transaction mgr-T6 which is the same as transaction agt1-T5 (nodes 728, 730, 732 and 734). Mgr-branch7 represents a transaction mgr-T7 which is the same as transaction agt1-T6 (nodes 728, 736, 738 and 740).

The node identifiers in FIG. 14A are the same as in FIG. 7A1 except for: node 744 (0:0:0:0), node 746 (0:0:0:0:0), node 748 (0:0:0:0:0:0), node 750 (0:0:0:0:0:0:0), node 706 (0:0:0:0:0:0:0:0), node 708 (0:0:0:0:0:0:0:0:0), node 752 (0:0:0:0:1), node 754 (0:0:0:0:1:0), node 756 (0:0:0:0:1:0:0), node 790 (0:0:0:0:1:0:0:0) and node 792 (0:0:0:0:1:0:0:0:0). These are identifiers of the manager. The identifiers of mgr-branch1, mgr-branch2, mgr-branch3, mgr-branch4, mgr-branch5, mgr-branch6 and mgr-branch7 are the identifiers of nodes 708, 792, 714, 720, 726, 734 and 740, respectively, as seen by agent1.

When the tree data structure of the manager combines tree data structures of different agents, a transaction of the manager can combine multiple transactions of multiple agents. As an example of a one-to-many correspondence of a manager transaction to agent transactions, mgr-T1 combines agt1-T1 and agt2-T1. See FIGS. 15A1-15A3. In this case, a user interface display of a manager's transaction can be based on multiple, agent transactions.

Alternatively, the tree data structure of the manager need not combine the tree data structures of the different agents, but the manager can maintain a separate tree data structure for each agent which is essentially a copy of each agent's tree data structure. In this case, a transaction of the manager can be the same as a transaction of the agent. As an example of a one-to-one correspondence of a manager transaction to an agent transaction, mgr-T3 is the same as agt1-T2. In this case, a user interface display of a manager's transaction can be based on a single agent transaction.

Or, the manager can maintain both separate tree data structures of the different agents, and a tree data structure which combines the tree data structures of the different agents. The separate tree data structure could be used for branch matching, such as in step 904 of FIG. 9, while tree data structure which combines the tree data structures of the different agents could be used for providing a user interface, such as in steps 1008 and 1010 of FIG. 16A, for instance.

FIG. 14B depicts a correspondence between a last node in agent1's tree data structure of FIG. 7A1 and a last node of the manager's tree data structure of FIG. 14A. As mentioned, the identifier of the last node of a branch in a tree data structure can be used to uniquely identify the branch. In some cases, the same last node identifier is used in the tree data structures of an agent and manager. In other cases, such as when the manager combines tree data structures of different agents, different last node identifiers can be used in the tree data structures of the agent and manager. The manager can maintain a correspondence record between last node identifiers. For example, agent1's last node identifier of 0:0:0:0:0 corresponds to two last nodes of the manager (nodes 708 and 792), having identifiers 0:0:0:0:0:0:0:0 and 0:0:0:0:1:0:0:0:0. The remaining last node identifiers of agent1 (see identifiers of nodes 714, 720, 726, 734 and 740 in FIG. 7A1) are the same as for the manager. Also, agent2's last node identifier of 0:0:0:0:0 corresponds to two last nodes of the manager, having identifiers 0:0:0:0:0:0 and 0:0:0:0:1:0:0. In this example, there are no remaining last node identifiers of agent2 to consider. The node # is provided as an aid to understanding and is not necessarily part of the correspondence record.

Thus, when the manager receives a last node identifier from agent1 of a first node sequence, and a last node identifier from agent2 of a second node sequence, it can access its tree data structure based on one or more of these last node identifiers. Moreover, the access can be based on agent1's and/or agent2's last node identifier directly and/or based on the manager's corresponding last node identifier.

Figure 14C:
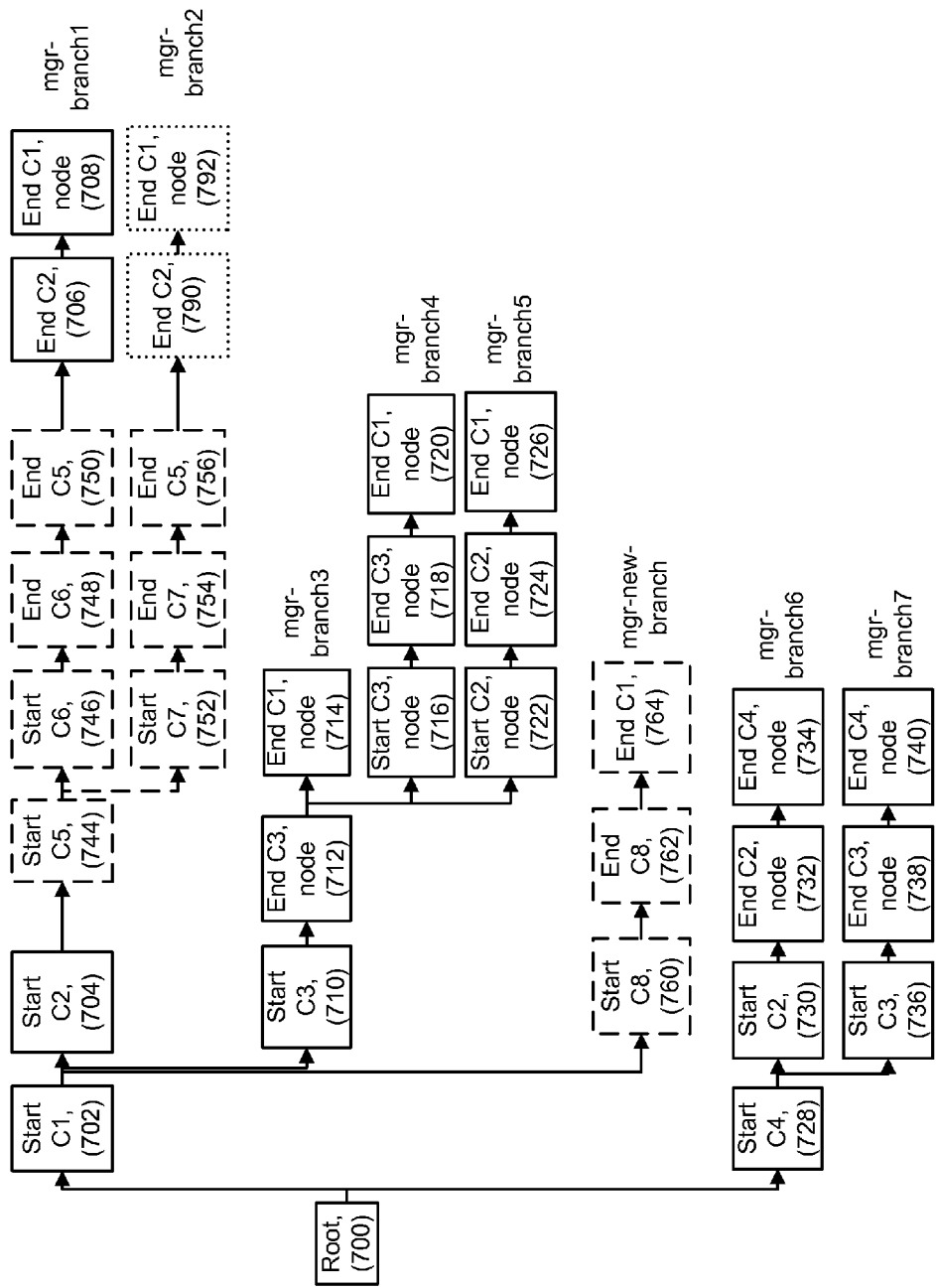
FIG. 14C illustrates an update to the tree data structure of the manager of FIG. 14A in the form of a new branch, consistent with the update to the tree data structure of agent1 in FIG. 9B.

FIG. 14C depicts an update to the tree data structure 701 of the manager of FIG. 14A in the form of a new branch, consistent with the update to the tree data structure of agent1 in FIG. 9B. The update is a new branch, mgr-new-branch, which includes nodes 760, 762 and 764, consistent with the update of agt1-new-branch to agent1's tree data structure.

FIG. 15A1 depicts a record of branches and component invocations for subsystem1 in the tree data structure of FIG. 7A1. Each branch is identified by a last node identifier. For example "0:0:0:0:0" identifies the node 708 in FIG. 7A1, thereby also identifying agt1-branch1 and a corresponding transaction agt1-T1, both in subsystem1. The component invocations for this branch are: start C1 (node 702), start C2 (node 704), end C2 (node 706) and end C1 (node 708).

"0:0:1:0:0" identifies the node 714 in FIG. 7A1, thereby also identifying agt1-branch2 and a transaction agt1-T2, both in subsystem1. The component invocations for this branch are: start C1 (node 702), start C3 (node 710), end C3 (node 712) and end C1 (node 714).

"0:0:1:0:1:0:0" identifies the node 720 in FIG. 7A1, thereby also identifying agt1-branch3 and a transaction agt1-T3, both in subsystem1. The component invocations for this branch are: start C1 (node 702), start C3 (node 710), end C3 (node 712), start C3 (node 716), end C3 (node 716) and end C1 (node 720).

"0:0:1:0:2:0:0" identifies the node 726 in FIG. 7A1, thereby also identifying agt1-branch4 and a transaction agt1-T4, both in subsystem1. The component invocations for this branch are: start C1 (node 702), start C3 (node 710), end C3 (node 712), start C2 (node 722), end C2 (node 724) and end C1 (node 726).

"0:1:0:0:0" identifies the node 734 in FIG. 7A1, thereby also identifying agt1-branch5 and a transaction agt1-T5, both in subsystem1. The component invocations for this branch are: start C4 (node 728), start C2 (node 730), end C2 (node 732) and end C4 (node 734).

"0:1:1:0:0" identifies the node 740 in FIG. 7A1, thereby also identifying agt1-branch6 and a transaction agt1-T6, both in subsystem1. The component invocations for this branch are: start C5 (node 744), start C7 (node 752), end C7 (node 754) and end C5 (node 756).

FIG. 15A2 depicts a record of branches and component invocations for subsystem2 in the tree data structure of FIG. 7A1.

"0:0:0:0:0" identifies the node 750 in FIG. 7A1, thereby also identifying agt2-branch1 and a transaction agt2-T1, both in subsystem2. The component invocations for this branch are: start C5 (node 744), start C6 (node 746), end C6 (node 748) and end C5 (node 750).

"0:0:1:0:0" identifies the node 756 in FIG. 7A1, thereby also identifying agt2-branch2 and a transaction agt2-T2, both in subsystem2. The component invocations for this branch are: start C5 (node 744), start C6 (node 746), end C6 (node 748) and end C5 (node 750).

FIG. 15B1 depicts a record of references to static data for different nodes of subsystem1 in the tree data structure of FIG. 7A1. As mentioned, various types of static data can be referenced to a component and its associated nodes. For example, node "0:0" is associated with component C1 and is referenced to static_data_C1 (e.g., methodC1, classC1 and JARC1, etc.) Different records of static data which are referenced are depicted in FIG. 15D, discussed further below. The class name can include names of one or more parent or super classes as well. In one approach, one or more of the nodes are referenced to static data. In another approach, the nodes which represent the start of a component (but not the nodes which represent the end of a component) are referenced to static data. Other approaches are possible. A goal is to enable the manager to access the static data which is associated with a given component or node such as to annotate a user interface, e.g., a transaction trace. The records of FIGS. 15A1 and 15B1 can be provided as part of a tree data structure by an agent and/or by a manager to which the agent reports.

The record can group the nodes which form a branch or a portion of a branch. For example, the first five entries ("0:0" through "0:0:0:0:0") are for agt1-branch1, and the last entry ("0:0:0:0:0") is an identifier of the branch. The entries 0:0:1, 0:0:1:0 and 0:0:1:0:0 are for nodes in agt1-branch2 which are not in agt1-branch1.

The nodes can be referenced directly to one or more types of static data, or to an identifier which is referenced to the one or more types of static data. In this way, the static data identifier can be repeated efficiently in the record without repeating the one or more types of static data.

The static data can be obtained from the instrumentation of the software, including instrumentation of the one or more components to which the static data is referenced.

The static data of a transaction can be obtained mostly from instrumentation. However, as a principle, it can be obtained from other sources, and mashed up or combined with other static data if necessary. For example, it can be detected from other sources that a given piece of code is statically always related to a given application, or statically always going to be of lower priority. This information may be used to determine the behavior of the trace.

Static data may include all types of information which are available from tracing the software. Static data can also indicate that a given component can be called by only a limited number of one or more parent components and/or that the given component can call only a limited number of one or more child components, because of the way the software is structured. For example, the static data may indicate that C2 is only called by C1 or C4, and that C2 only calls C5. Static data can also indicate that a given component can call only a limited number of one or more child components, based on one or more parent components which called the given component. In terms of the tree data structure, for instance, a given node may only have one child node based on how the given node was reached, e.g., in a given context. This information can be useful in the matching step 904 as well as in segregating transaction data according to a transaction context.

As another example, a servlet can call many different methods of a database using SQL statements. But, the servlet will not call the methods arbitrarily all the time. It will call some SQLs if something has happened previously or other SQLs if something else has happened previously. This provides a partition of the SQLs that is relevant according to the business logic. For example, if a transaction is to buy a book on a web site, one portion of the database logic is used, while if a transaction is to buy a hat on a web site, another portion of the database logic is used. In both cases, the servlet may use the same socket to make the database call. But, the use of the tree data structure allows data to be gathered in a specific transaction context. This data can include a transaction trace and the metrics it yields such as response time, as well as other metrics which are obtained for a transaction.

The static data can be cached by the agent so that it does not have to be repeatedly retrieved from the software and/or the instrumentation.

FIG. 15B2 depicts a record of references to static data for different nodes/components of subsystem2 in the tree data structure of FIG. 7A1. These records can be provided as part of a tree data structure by an agent of subsystem2 and reported to an associated manager. This can be the same manager that the agent of subsystem1 reports to, for instance. Multiple agents can report to a common manager. In the record, as an example, node "0:0" is associated with component C5 and is referenced to static data C5.

FIG. 15B3 depicts an update to the record of FIG. 15B1 for agt1-new-branch in FIG. 9B. The nodes 760, 762 and 764 have identifiers 0:0:2, 0:0:2:0 and 0:0:2:0:0, respectively, and are indexed to static_data_C8, static_data_C8 and static_data_C1, respectively.

FIG. 15B4 depicts a record of references to static data for different nodes/components of a manager in the tree data structure of FIG. 14A. Each node has associated static data, as discussed.

FIG. 15B5 depicts an update to the record of FIG. 15B4 for mgr-new-branch7 in FIG. 14C. The nodes 760, 762 and 764 have identifiers 0:0:2, 0:0:2:0 and 0:0:2:0:0, respectively, and are indexed to static_data_C8, static_data_C8 and static_data_C1, respectively. The update is the same as in FIG. 15B3, in this example, due to the common node identifiers. In other cases, the updates can differ, e.g., due to different node identifiers.

FIG. 15C depicts a record of dynamic data from tracing details for different nodes/components of subsystem1 of the tree data structure of FIG. 7A1. The record can be provided as part of a tree data structure by an agent of subsystem1 and reported to an associated manager. Dynamic data can be obtained by an agent by tracing at least one application or other monitored software instance. The dynamic data can indicate the start and end times of components. Other dynamic can include parameters passed in calls between components. For example, in FIG. 5A, C1 can call C2 with one or more parameters related to a requested report, e.g., a type of the report or a date range of the report. When the control flow returns to C1, C2 can pass one or more related parameters to C1. Each subsystem, via its associated agent, can obtain dynamic data and report it to a manager. The record can be provided as part of a tree data structure by an agent of subsystem1 and by a manager to which the agent reports.

The dynamic data includes an entry for node "0:0", which is associated with C1, and which includes a start time (t1) for C1 and other associated dynamic data (dynamic_data__1), such as a parameter1 passed in a call to C1. An entry for node "0:0:0" is associated with C2, and includes a start time (t2) for C2 and other associated dynamic data (dynamic_data__2), such as a parameter2 passed in a call to C2. An entry for node "0:0:0:0" is associated with C2, and includes an end time (t3) for C2 and other associated dynamic data (dynamic_data__3), such as a parameter3 passed in a return to C2, e.g., a return of a program flow to C2 from a component which was called by C2. An entry for node "0:0:0:0:0" is associated with C1, and includes an end time (t4) for C1 and other associated dynamic data (dynamic_data__4), such as a parameter4 passed in a return to C1, e.g., a return of a program flow to C1 from a component which was called by C1.

FIG. 15D depicts records of static data associated with different components. Each record can include various types of static data as discussed herein. The records of static data include static_data_C1, static_data_C2, static_data_C3, static_data_C4, static data C5, static_data_C6, static_data_C7 and static_data_C8. The records of static data can be maintained by the agent and manager.

Figure 16B:
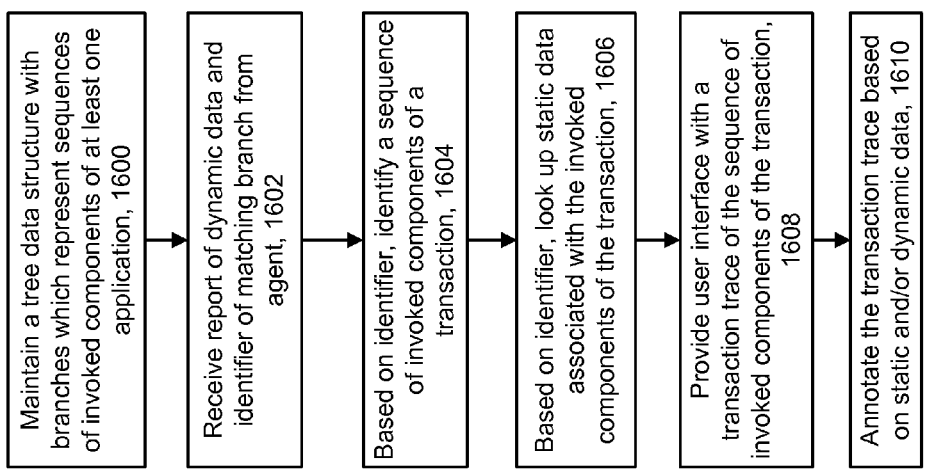
FIG. 16B illustrates an example process in which a manager updates a tree data structure based on updates received from one or more agents.
Figure 16A:
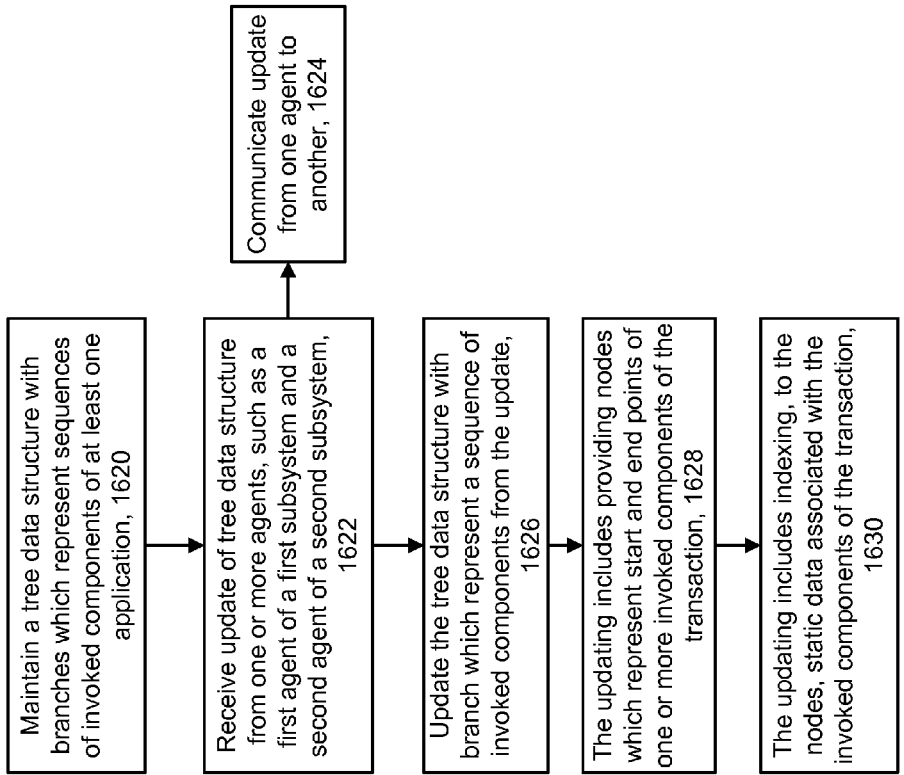
FIG. 16A illustrates an example process in which a manager provides a user interface based on a report of dynamic data and a branch identifier of a tree data structure such as in FIG. 7A1, as received from an agent.

FIG. 16A depicts an example process in which a manager provides a user interface based on a report of dynamic data and a branch identifier of a tree data structure such as in FIG. 7A1, as received from an agent. Step 1600 includes maintaining a tree data structure of the manager with branches which represent sequences of invoked components of at least one application, such as by start and stop points of the components. Step 1602 includes receiving a report of dynamic data and an identifier of a matching branch from an agent. Step 1604 includes, based on the identifier, identifying a sequence of invoked components. This can involve accessing a record such as in FIG. 15A1 to determine that agt1-branch1 is identified by the branch whose last node identifier is "0:0:0:0:0", and that this branch includes the components sequence of: start C1, start C2, end C2 and end C1.

Alternatively, step 1604 can include accessing a record such as in FIG. 14B to determine that agent1's last node of 0:0:0:0:0 corresponds to the manager's last node of 0:0:0:0:0:0:0:0, and accessing a record such as in FIG. 15A3 to determine that mgr-branch1 is identified by the manager's last node of 0:0:0:0:0:0:0:0:0, and that this branch includes the components sequence of: start C1, start C2, start C5, start C6, end C6, end C5, end C2, end C1.

Step 1606 includes, based on the identifier, looking up static data associated with the invoked components of the transaction. This can involve accessing a record such as in FIG. 15B1, e.g., to identify static_data_C1 which is indexed to node/branch identifier "0:0:0:0:0" and each of the nodes of the branch. Alternatively, this can involve accessing a record such as in FIG. 15B4, e.g., to identify static_data_C1 which is indexed to node/branch identifier "0:0:0:0:0:0:0:0:0" and each of the nodes of the branch.

Step 1608 includes providing a user interface (UI) with a transaction trace of the sequence of invoked components of the transaction. The transaction trace can be provided directly from the identified branch, since the branch identifies the start and stop of each component of the branch. Examples of transaction traces which can be provided on a user interface are in FIGS. 6A-6I, 11A and 11B. Step 1610 includes annotating the transaction trace based on the static and/or dynamic data, such as depicted in FIGS. 11A and 11B. This can include displaying the static and/or dynamic data on the user interface. As another example, a UI could be provided such as discussed in connection with FIGS. 14A-14C.

FIG. 16B depicts an example process in which a manager updates a tree data structure based on updates received from one or more agents. Step 1620 includes maintaining a tree data structure with branches which represent sequences of invoked components of at least one application, such as by start and stop points of the components. Step 1622 includes receiving an update of a tree data structure from one or more agents, such as a first agent of a first subsystem and a second agent of a second subsystem. Step 1624 includes communicating an update from one agent to another. The manager can pass on or relay an update which is received from one agent to another agent, when the agents monitor different instances of the same software. In this way, new transactions can be propagated quickly among agents so that the tree data structures of the agents are synchronized. Step 1626 includes updating the tree data structure of the manager with a branch which represents a sequence of invoked components from the update. For example, this can include adding the mgr-new-branch in FIG. 14C. The update can involve updating the records of the manager's tree data structure, e.g., based on the record of FIG. 15B3.

In step 1628, the updating includes providing nodes which represent start and end points of one or more invoked components of the transaction. For example, this can include adding the nodes 760, 762 and 764 of mgr-new-branch in FIG. 14C. In step 1630, the updating includes indexing, to the nodes, static data associated with the invoked components of the transaction, such as depicted in connection with the records of FIG. 15B5. Note that the update to the manager's tree data structure can include some of the nodes of the agent's tree data structure (e.g., nodes 760, 762 and 764) but not other of the nodes of the agent's tree data structure (e.g., node 702), in the example of mgr-new-branch of FIG. 14C.

FIG. 17A depicts the transaction trace of FIG. 6A with annotation using static and dynamic data. The transaction traces provide a complete picture of a transaction/execution flow. Here, the annotation is provided in the graph region 600 for C1 and in the graph region 602 for C2. The annotation "methodC1|classC1|JARC1|dynamic_data_1" includes three types of static data followed by dynamic data, where each piece of data is separated by a vertical bar. However, other formats are possible. For example, the annotation can be provided outside the graph regions of the transaction trace, e.g., above or to the side, in a mouse over or hover box, tooltip, by right-clicking to access information, in a pop up window, separate window or display screen, and so forth. The dynamic data can be distinguished separately from the static data by its appearance, color, font, location, etc.

FIG. 17B depicts the transaction trace of FIG. 6A with annotation using static and dynamic data. The annotation is provided in the graph region 610 for C5 and in the graph region 612 for C6. Note that the transaction traces of FIGS. 17A and 17B could be displayed on the same user interface concurrently, to provide the user with a better understanding of the behavior of a transaction which extends across subsystems. Recall that C1 and C2 are in subsystem1 and C5 and C6 are in subsystem2. If the clocks of the subsystems are adequately synchronized, the transaction traces of the subsystems can be displayed using a common time line reference. If the synchronization is not assured, the transaction traces of the subsystems can be displayed using separate time line references. The manager can decide to associate the two transaction traces in the user interface based on a correlation identifier which C2 provides to C5 when calling it. The agents provide the correlation identifier to the manager when reporting the transaction traces using the tree data structure to indicate that the traces should be associated. For further information, see US2007/0143323, published Jun. 21, 2007, titled "Correlating Cross Process And Cross Thread Execution Flows In An Application Manager," incorporated herein by reference.

For example, when C2 is invoked in the transaction agt1-T1, it can include an identifier of agt1-T1 when it calls C5. Agent1, when reporting to the manager regarding the transaction agt1-T1, includes the identifier agt1-T1. Similarly, agent2, when reporting to the manager regarding the transaction agt2-T1, includes the identifiers agt1-T1 and agt2-T1. The manager then knows that the transactions/transaction traces of the identifiers agt1-T1 and agt2-T1 are associated.

Another example user interface provides the tree data structures of FIGs. directly, e.g., by displaying the nodes and edges between them. Status and dynamic data can be displayed within or next to the nodes.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
    maintaining a tree data structure comprising branches comprising nodes, each branch corresponds to a transaction performed by an application that comprises a plurality of components, a given branch comprising nodes that correspond to components of the application that are invoked to perform the transaction, each node corresponding to an element of a transaction;
    maintaining transaction data associated with the tree data structure, the transaction data for transactions performed by the application;
    constructing a provisional branch comprising nodes that correspond to elements of an instance of a first of the transactions being monitored by an agent, the provisional branch comprising a virtual node for a first transaction element that cannot be identified during monitoring of the instance of the first transaction based on information available to the agent;
    storing transaction data in association with the nodes in the provisional branch during the monitoring, comprising storing dynamic transaction data for a sequence of components of the application that are invoked to perform the instance of the first transaction;
    identifying the first transaction element after information needed to identify the first transaction element becomes available to the agent;
    determining a branch in the tree data structure that matches the provisional branch after the first transaction element has been identified;
    replaying the instance of the first transaction against the branch in the tree data structure that matches the provisional branch as if the instance of the first transaction were happening again to merge the dynamic transaction data with the transaction data that is associated with the tree data structure; and
    reporting the transaction data associated with the tree data structure after the replaying.

2. The method of claim 1, further comprising:
    determining that information needed to identify the first transaction element has become accessible to the agent;
    accessing the information needed to identify the first transaction element;
    matching the information to a rule to identify the first transaction element; and
    updating the virtual node based on the identified first transaction element.

3. The method of claim 1, wherein the storing transaction data in association with the nodes in the provisional branch during the monitoring comprises:
    storing transaction data for the first transaction element in association with the virtual node at a time when the information needed to identify the first transaction element is not accessible to the agent.

4. The method of claim 1, further comprising:
    determining that information needed to identify the first transaction element is not accessible to the agent, the determining comprises determining that identifying the first transaction element comprises accessing POST parameters.

5. The method of claim 1, further comprising:
    determining that information needed to identify the first transaction element is not accessible to the agent, the determining comprises determining that identifying the first transaction element comprises accessing an element of a reply associated with the first transaction.

6. The method of claim 1, wherein the reporting the transaction data in response to determining the branch in the tree data structure that matches the provisional branch comprises:
    reporting an identifier of the determined branch from the agent to a manager.

7. The method of claim 1, wherein the transaction data is indexed to nodes in the matching branch which represent starting and ending points of invoked components of the application that are associated with first transaction.

8. The method of claim 1, wherein the storing transaction data in association with the nodes in the provisional branch during the monitoring comprises storing the transaction data in local storage owned by code that executes the first transaction, the code executes one instance of the first transaction, dynamic transaction data for other instances of the first transaction. is stored in local storage owned by other code that executes the other instances of the first transaction.

9. A system comprising:
    a storage device; and
    a processor in communication with said storage device, said processor programmed to:
    monitor execution of transactions performed by an application that comprises a plurality of components, the monitoring performed by an agent;
    maintain a tree data structure comprising branches comprising nodes, each branch corresponds to a type of transaction being monitored, each branch comprising a unique identifier, each node corresponding to an element of a given transaction, the nodes of a given branch corresponding to components of the application that are invoked to perform the given transaction;
    maintain transaction data associated with the tree data structure. the transaction data for transactions performed by the application;
    construct a provisional branch for an instance of a transaction being monitored, the provisional branch comprising nodes corresponding to components of the application that are invoked to perform the instance of the transaction;
    store dynamic transaction data in association with a virtual node in the provisional branch for a first transaction element that cannot be identified by the agent during execution of the instance of the first transaction;
    store dynamic transaction data in association with an actual node in the provisional branch for a second transaction element that can be identified by the agent during execution of the instance of the first transaction;

identify the first transaction element after information needed to identify the first transaction element becomes available to the agent;

determine a branch in the tree data structure that matches the provisional branch after the first transaction element has been identified;

replay the instance of the first transaction against the branch in the tree data structure that matches the provisional branch as if the instance of the first transaction were being executed again, the processor being programmed to replay comprises the processor being programmed to merge the dynamic transaction data for the virtual node and the dynamic transaction data for the actual node with the transaction data that is associated with the tree data structure; and report the transaction data associated with the tree data structure and the unique identifier of the matching branch after the merge.

10. The system of claim 9, wherein said processor is programmed to:

store the transaction data for the first transaction element in association with the virtual node at a time when the information needed to identify the first transaction element is not accessible to the agent.

11. The system of claim 9, wherein said processor is further programmed to:

determine that information needed to identify the first transaction element is not accessible to the agent, the determining comprises determining that identifying the first transaction element comprises accessing POST parameters.

12. The system of claim 9, wherein said processor is further programmed to:

determine that information needed to identify the first transaction element is not accessible to the agent, the determining comprises determining that identifying the first transaction element comprises accessing an element of a reply associated with the first transaction.

13. The system of claim 9, wherein the transaction data is indexed to nodes in the matching branch which represent starting and ending points of invoked components of the application that are associated with first transaction.

14. The system of claim 9, wherein said processor is further programmed to:

determine that information needed to identify the first transaction element has become accessible to the agent;

access the information needed to identify the first transaction element;

match the information to a rule to identify the first transaction element; and update the virtual node based on the identified first transaction element.

15. The system of claim 9, wherein said processor stores the transaction data in storage owned by code that executes the first transaction.

16. A computer program product comprising:

a computer readable hardware device comprising computer readable program code embodied therewith, the computer readable program code comprising:

computer readable program code configured to monitor execution of transactions performed by an application that comprises a plurality of components, the monitoring performed by an agent;

computer readable program code configured to maintain a tree data structure comprising branches comprising nodes, each branch corresponds to a type of transaction being monitored, each branch comprising a unique identifier, each node corresponding to an element of a transaction, a given branch comprises nodes that correspond to components of the application that are invoked to perform the transaction;

computer readable program code configured to maintain transaction data associated with the tree data structure, the transaction data for transactions performed by the application;

computer readable program code configured to construct a provisional branch for an instance of a transaction being monitored;

computer readable program code configured to store dynamic transaction data in association with a virtual node in the provisional branch for a first transaction element that cannot be identified by the agent while tracing the instance of the first transaction;

computer readable program code configured to store dynamic transaction data in association with an actual node in the provisional branch for a second transaction element that can be identified by the agent while tracing the instance of the first transaction;

computer readable program code configured to identify the first transaction element after information needed to identify the first transaction element is accessible to the agent;

computer readable program code configured to determine a branch in the tree data structure that matches the provisional branch after the first transaction element has been identified;

computer readable program code configured to replay the instance of the first transaction against the branch in the tree data structure that matches the provisional branch as if the instance of the first transaction were happening again to merge the dynamic transaction data of the virtual node and the dynamic transaction data of the actual node with the transaction data that is associated with the tree data structures; and computer readable program code configured to report the transaction data associated with the tree data structure and the unique identifier of the matching branch after the merge.

17. The computer program product of claim 16, wherein said computer readable program code configured is configured to:

determine that information needed to identify the first transaction element is not accessible to the agent, the determining comprises determining that identifying the first transaction element comprises accessing POST parameters.

18. The computer program product of claim 16, wherein said computer readable program code configured is configured to:

determine that information needed to identify the first transaction element is not accessible to the agent, the determining comprises determining that identifying the first transaction element comprises accessing an element of a reply associated with the first transaction.

19. The computer program product of claim 16, wherein said computer readable program code configured is configured to:

associate the transaction data to nodes in the matching branch which represent starting and ending points of invoked components of the application that are associated with first transaction.

20. The computer program product of claim 16, wherein said computer readable program code configured is configured to:

determine that information needed to identify the first transaction element has become accessible to the agent;

access the information needed to identify the first transaction element;

match the information to a rule to identify the first transaction element; and update the virtual node based on the identified first transaction element.

21. The computer program product of claim 16, wherein said computer readable program code configured is configured to:

store the transaction data in storage owned by a thread that executes the first transaction.

22. The method of claim 1, wherein:

the maintaining the transaction data associated with the tree data structure comprises storing the transaction data in storage owned by the agent;

the constructing the provisional branch and the storing transaction data in association with the nodes in the provisional branch comprise storing the provisional branch and the associated transaction data in thread local storage owned by a thread that executes the instance of the first transaction; and the replaying comprises merging the transaction data from the thread local storage with the transaction data in the agent storage.

23. The method of claim 22, wherein the replaying the instance of the first transaction comprises:

walking down the provisional branch from a root node to a leaf node; and transferring transaction data for one or more nodes in the provisional branch from the thread local storage to the agent storage as nodes in the provisional branch are encountered.

* * * * *

UNITED STATES PATENT AND TRADEMARK OFFICE
CERTIFICATE OF CORRECTION

PATENT NO. : 8,812,434 B2  Page 1 of 1
APPLICATION NO. : 13/651160
DATED : August 19, 2014
INVENTOR(S) : Gagliardi et al.

It is certified that error appears in the above-identified patent and that said Letters Patent is hereby corrected as shown below:

In the Claims,

Col. 34, claim 8, line 36: After "action" and before "is" please remove the ".".

Signed and Sealed this
Second Day of June, 2015

Michelle K. Lee
*Director of the United States Patent and Trademark Office*